(12) United States Patent
Tanaka

(10) Patent No.: US 12,501,731 B2
(45) Date of Patent: Dec. 16, 2025

(54) IMAGING DEVICE WITH LENS AND SEPARATION SECTION ARRANGEMENTS

(71) Applicant: Sony Semiconductor Solutions Corporation, Kanagawa (JP)

(72) Inventor: Masanori Tanaka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 383 days.

(21) Appl. No.: 18/034,233

(22) PCT Filed: Dec. 3, 2021

(86) PCT No.: PCT/JP2021/044560
§ 371 (c)(1),
(2) Date: Apr. 27, 2023

(87) PCT Pub. No.: WO2022/131034
PCT Pub. Date: Jun. 23, 2022

(65) Prior Publication Data
US 2023/0387166 A1    Nov. 30, 2023

(30) Foreign Application Priority Data
Dec. 17, 2020    (JP) .................................. 2020-209677

(51) Int. Cl.
*H10F 39/00*    (2025.01)
(52) U.S. Cl.
CPC ..... *H10F 39/8063* (2025.01); *H10F 39/8053* (2025.01); *H10F 39/807* (2025.01)
(58) Field of Classification Search
CPC ............... H10F 39/8053; H10F 39/806; H10F 39/8063; H10F 39/807
See application file for complete search history.

(56) References Cited

U.S. PATENT DOCUMENTS

2017/0186795 A1\*    6/2017    Tsai .................... H10F 39/024
2018/0063456 A1\*    3/2018    Lee .................... H04N 25/133
(Continued)

FOREIGN PATENT DOCUMENTS

JP    H03283572 A    12/1991
JP    2013191869 A    9/2013
(Continued)

OTHER PUBLICATIONS

International Search Report (PCT/ISA/210), International Application No. PCT/JP2021/044560, dated Feb. 15, 2022.

*Primary Examiner* — Matthew E Warren
(74) *Attorney, Agent, or Firm* — Michael Best & Friedrich LLP

(57)    ABSTRACT

An imaging device according to an embodiment of the present disclosure includes: a semiconductor substrate which has a first surface and a second surface opposed to each other, and in which a plurality of pixels are arranged in matrix, the semiconductor substrate including a plurality of photoelectric conversion sections that each generate electric charge corresponding to a light receiving amount by photoelectric conversion for each pixel; a first lens disposed for each pixel; a second lens disposed between the semiconductor substrate and the first lens for each photoelectric conversion section; a first separation section provided between adjacent photoelectric conversion sections in each pixel and optically separating the adjacent photoelectric conversion sections from each other; and a second separation section provided between adjacent pixels, optically separating the adjacent pixels from each other, and protruding farther than the first separation section in a light incident direction.

15 Claims, 14 Drawing Sheets

(56) References Cited

U.S. PATENT DOCUMENTS

| | | | | |
|---|---|---|---|---|
| 2020/0172443 A1* | 6/2020 | Kawamura | ............ | H10F 39/18 |
| 2020/0381469 A1* | 12/2020 | Kanesada | ........... | H10F 39/8053 |
| 2022/0045110 A1* | 2/2022 | Fujita | .................. | H04N 25/704 |

FOREIGN PATENT DOCUMENTS

| | | | | | |
|---|---|---|---|---|---|
| JP | 2015026708 A | | 2/2015 | | |
| JP | 2016015430 A | | 1/2016 | | |
| JP | 2017212351 A | | 11/2017 | | |
| JP | 2018201061 A | * | 12/2018 | | |
| JP | 2019004043 A | | 1/2019 | | |
| KR | 20180040308 A | * | 4/2018 | ............ | H04N 23/55 |
| WO | 2017130723 A1 | | 8/2017 | | |
| WO | 2020013130 A1 | | 1/2020 | | |
| WO | 2020137203 A1 | | 7/2020 | | |

\* cited by examiner

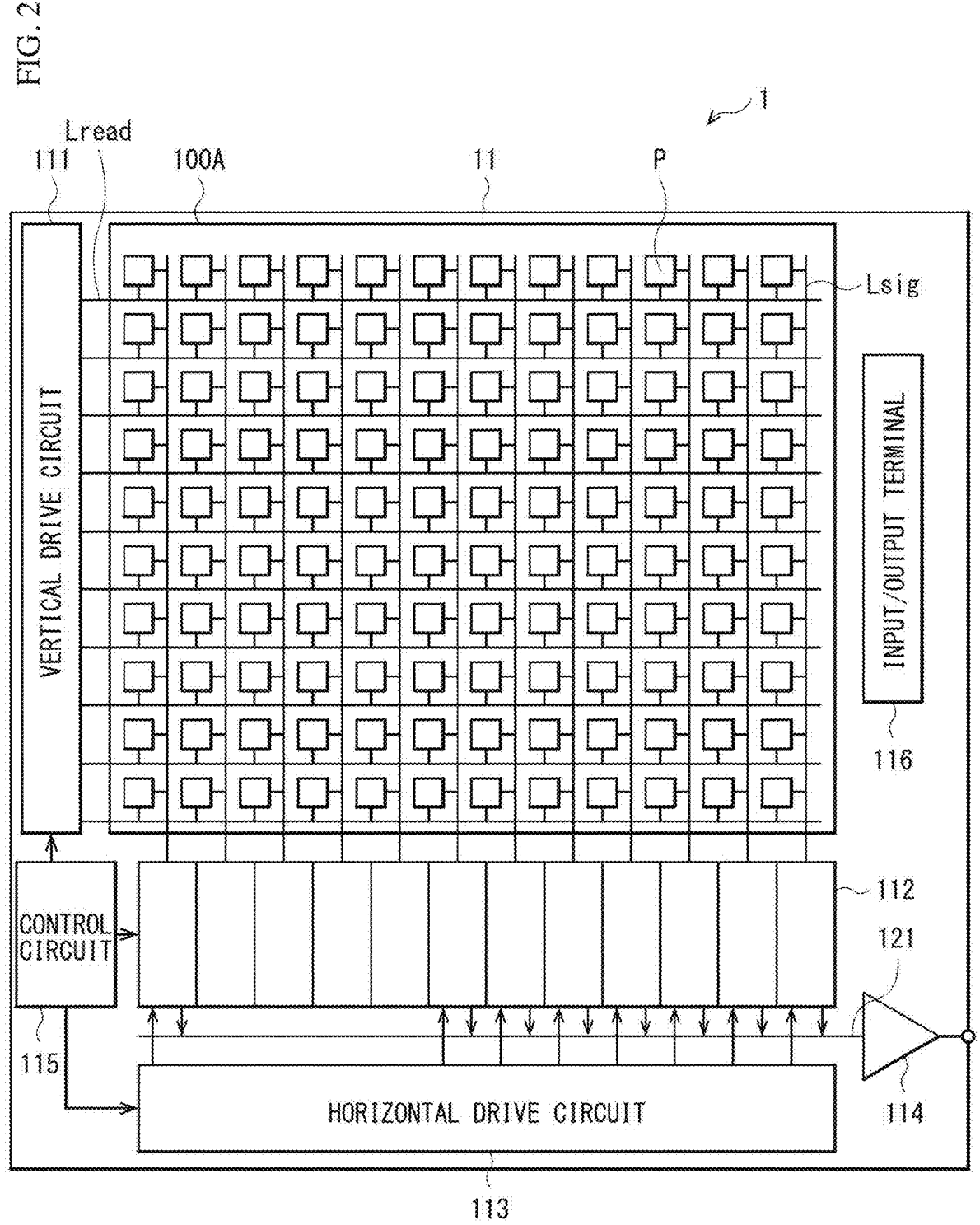

[FIG. 3]
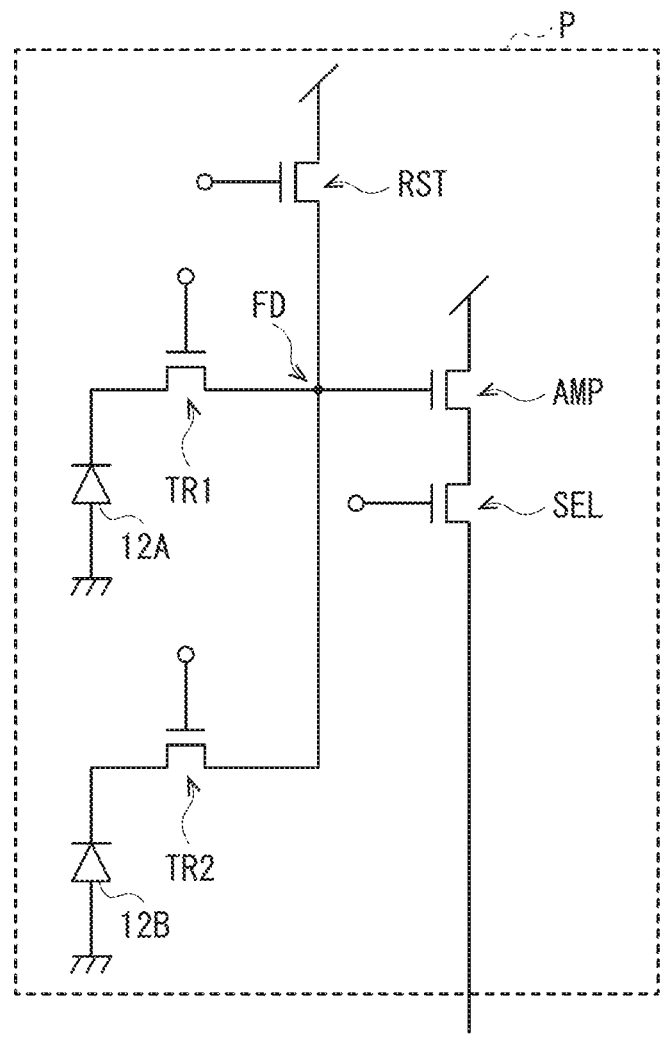

[ FIG. 4 ]
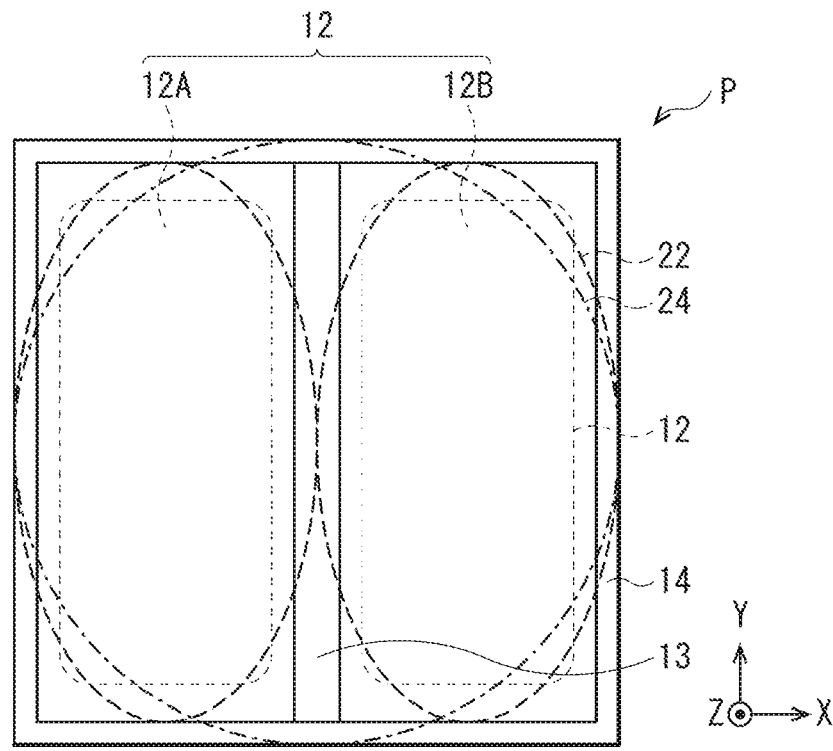
[ FIG. 5 ]
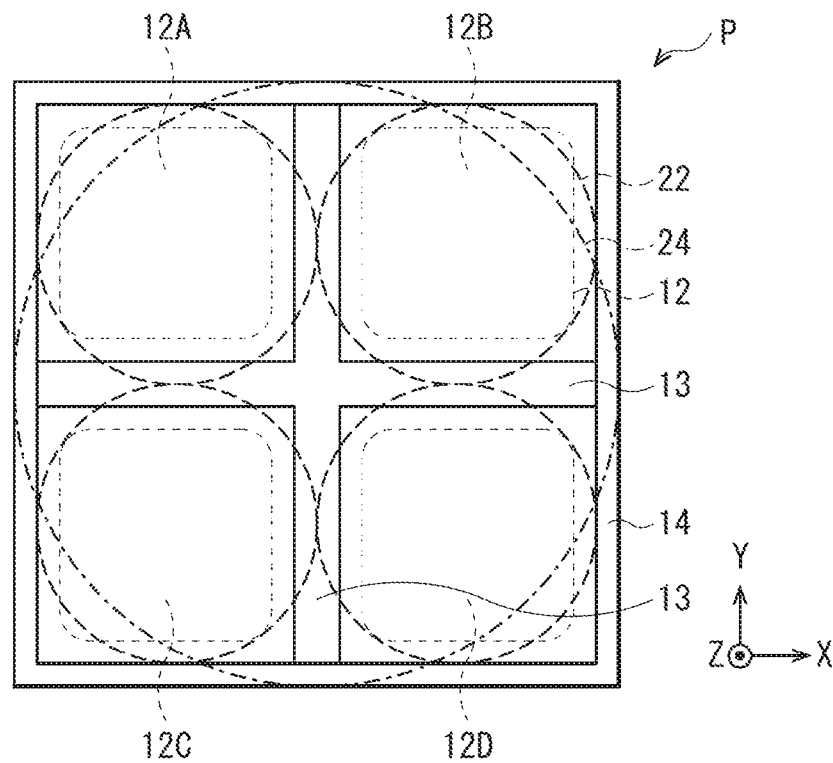

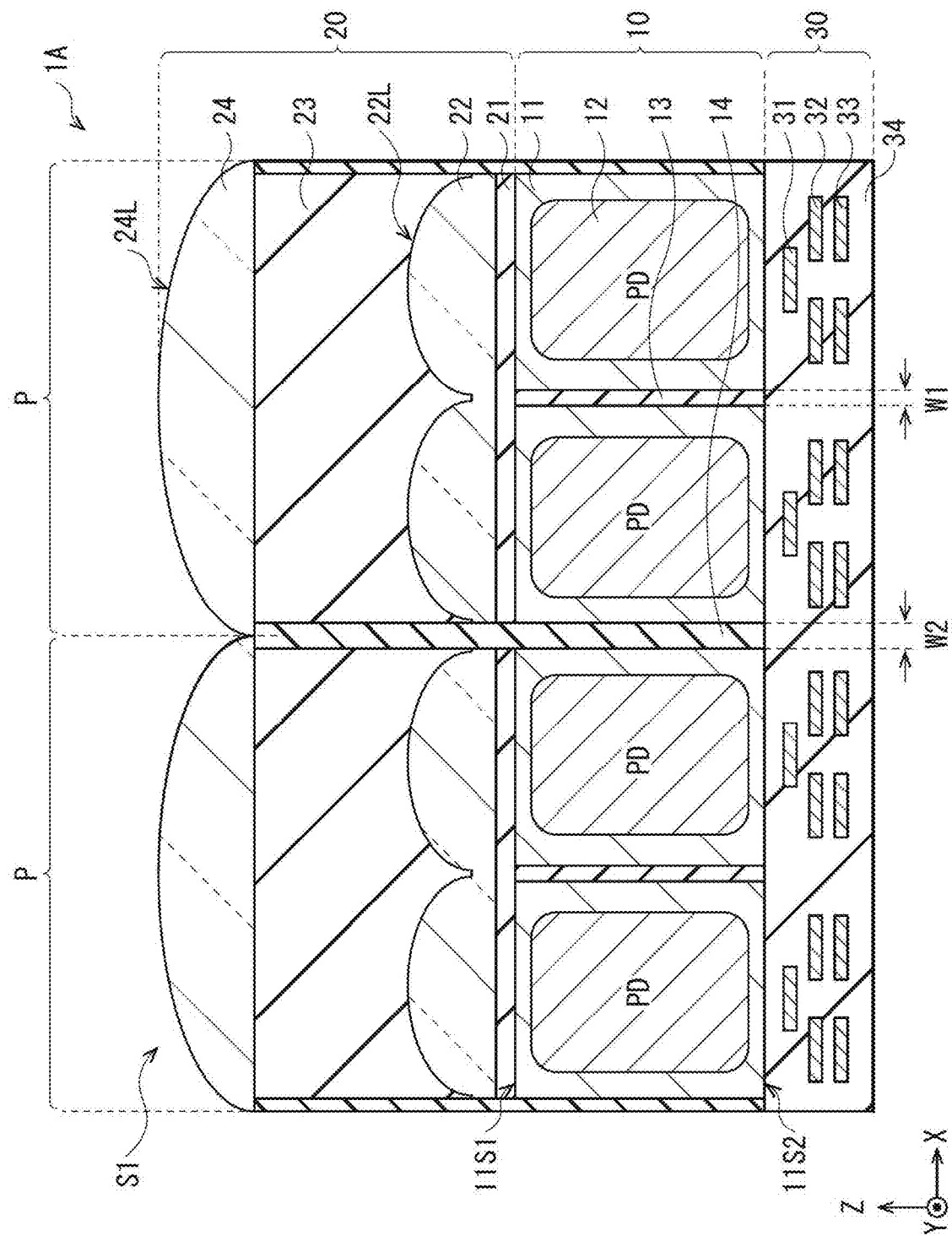

[ FIG. 15 ]
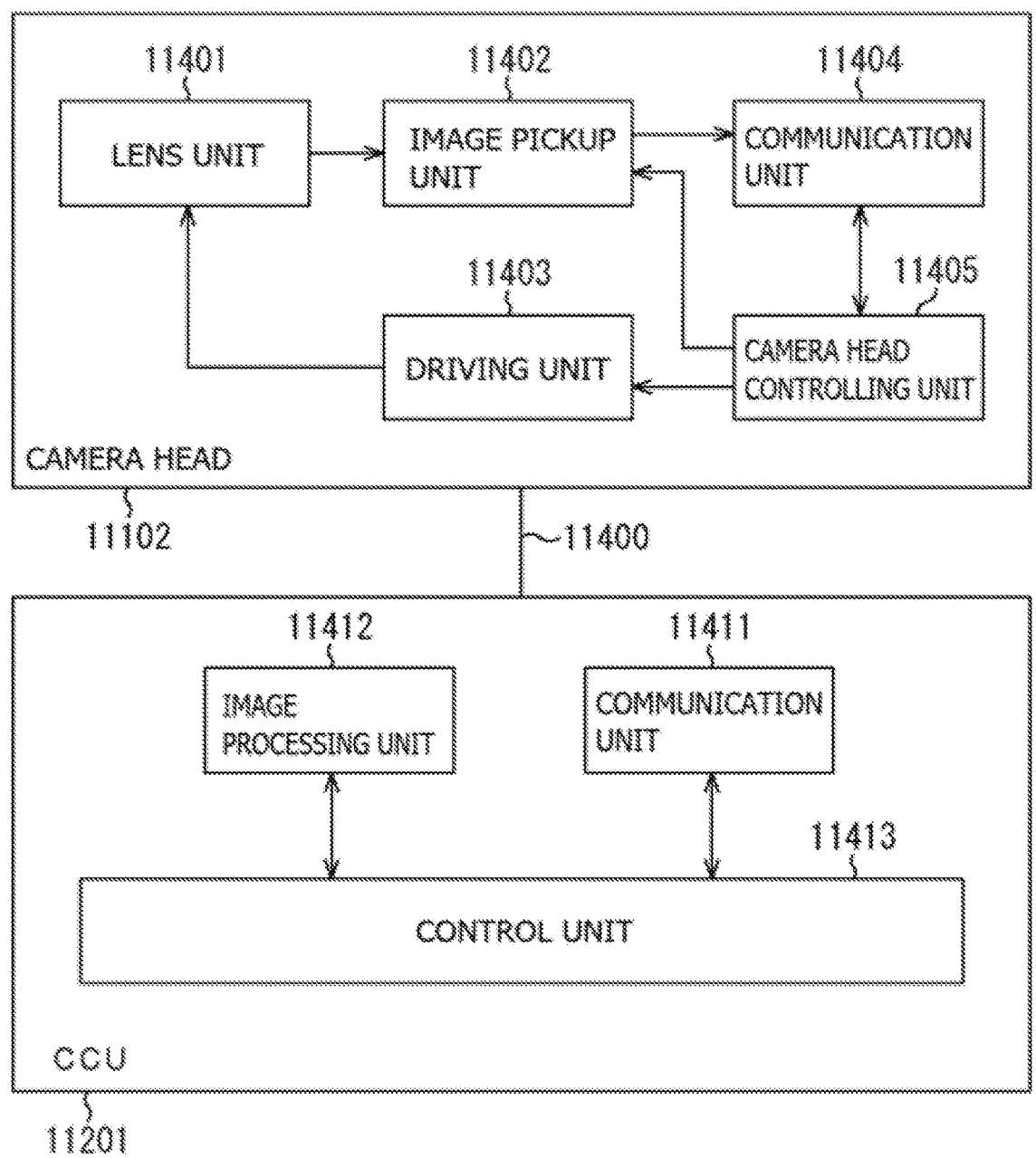

IMAGING DEVICE WITH LENS AND SEPARATION SECTION ARRANGEMENTS

TECHNICAL FIELD

The present disclosure relates to an imaging device that is able to acquire imaging information and parallax information, for example.

BACKGROUND ART

For example, PTL 1 discloses an imaging device that achieves acquisition of an appropriate image corresponding to a light receiving amount and an improvement in focus detection accuracy by providing a first separation section and a second separation section that form different potential barriers between a first photoelectric conversion section and a second photoelectric conversion section.

CITATION LIST

Patent Literature

PTL 1: Japanese Unexamined Patent Application Publication No. 2017-212351

SUMMARY OF THE INVENTION

As described above, an imaging device that is able to acquire imaging information and parallax information is required to have both pupil separation performance and imaging performance.

It is desirable to provide an imaging device that makes it possible to improve imaging performance while improving pupil separation performance.

An imaging device according to an embodiment of the present disclosure includes: a semiconductor substrate which has a first surface and a second surface opposed to each other, and in which a plurality of pixels are arranged in matrix, the semiconductor substrate including a plurality of photoelectric conversion sections that each generate electric charge corresponding to a light receiving amount by photoelectric conversion for each of the pixels; a first lens disposed for each of the pixels; a second lens disposed between the semiconductor substrate and the first lens for each of the photoelectric conversion sections; a first separation section provided between the photoelectric conversion sections adjacent to each other in each of the pixels and optically separating the adjacent photoelectric conversion sections from each other; and a second separation section provided between the pixels adjacent to each other, optically separating the adjacent pixels from each other, and protruding farther than the first separation section in a light incident direction.

In the imaging device according to an embodiment of the present disclosure, the first lens is disposed for each of the pixels on a side of a light incident surface of the semiconductor substrate in which a plurality of pixels are arranged in matrix and which includes the plurality of photoelectric conversion sections for each of the pixels, and the second lens is disposed between the first surface of the semiconductor substrate and the first lens for each of the photoelectric conversion sections. Further, there are provided: the first separation section optically separating the adjacent photoelectric conversion sections from each other in the pixel; and the second separation section optically separating the adjacent pixels from each other and protruding farther than the first separation section in the light incident direction. This allows for a reduction in occurrence of a crosstalk between the adjacent photoelectric conversion sections while causing light incident on a pixel to enter the photoelectric conversion section corresponding to an incident angle.

BRIEF DESCRIPTION OF THE DRAWINGS

FIG. 2 is a block diagram illustrating an overall configuration of the imaging device illustrated in FIG. 1.

FIG. 3 is an equivalent circuit diagram of a unit pixel illustrated in FIG. 1.

FIG. 4 is a schematic plan view of an example of a layout of a photoelectric conversion section, an inner lens, and an outer lens in the unit pixel illustrated in FIG. 1.

FIG. 5 is a schematic plan view of another example of the layout of the photoelectric conversion section, the inner lens, and the outer lens in the unit pixel illustrated in FIG. 1.

FIG. 6 is a schematic cross-sectional view of an example of a configuration of an imaging device according to Modification Example 1 of the present disclosure.

FIG. 15 is a block diagram depicting an example of a functional configuration of a camera head and a camera control unit (CCU).

MODES FOR CARRYING OUT THE INVENTION

Figure 1:
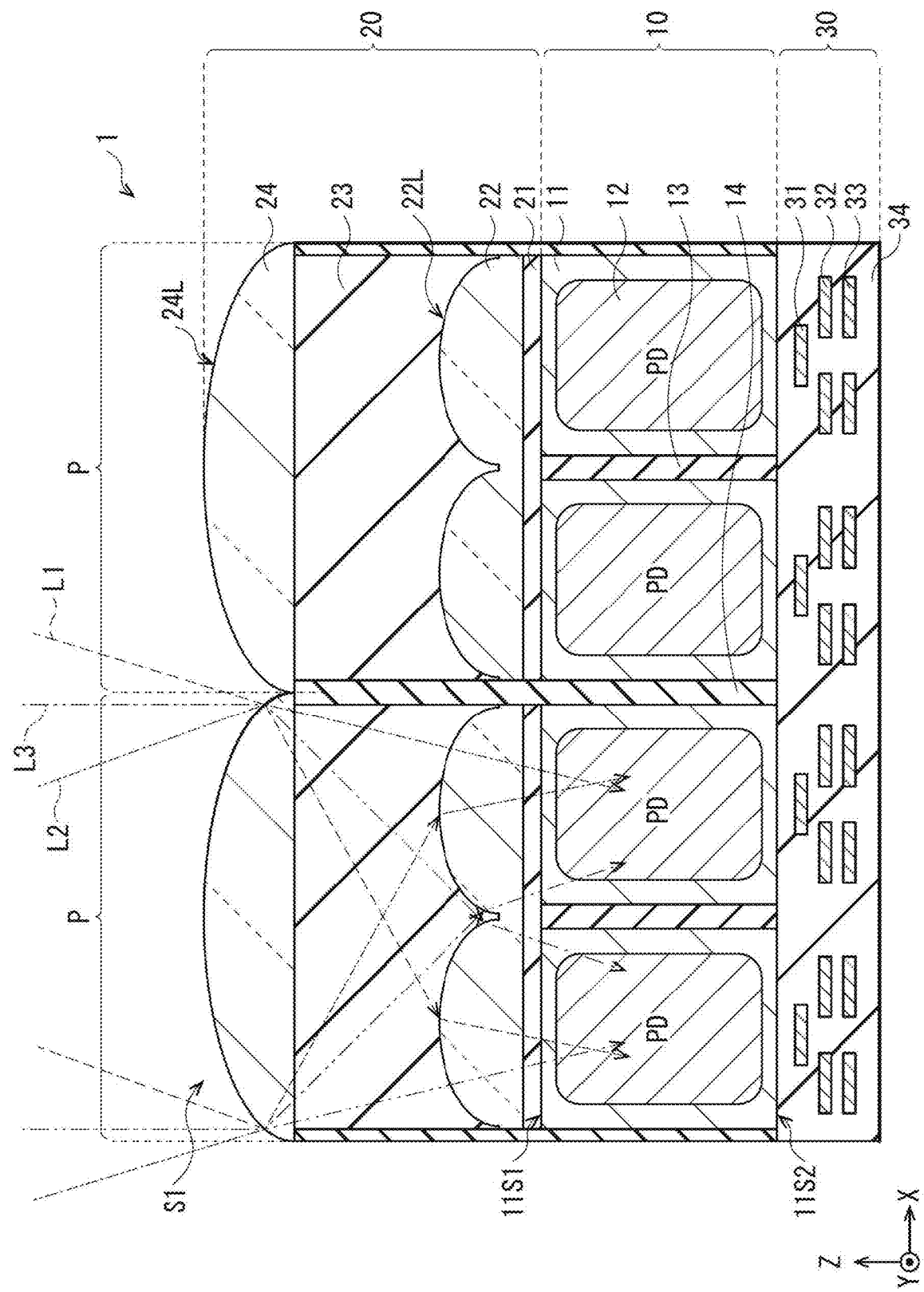
FIG. 1 is a schematic cross-sectional view of an example of a configuration of an imaging device according to an embodiment of the present disclosure.

In the following, description is given in detail of embodiments of the present disclosure with reference to the drawings. The following description is merely a specific example of the present disclosure, and the present disclosure should not be limited to the following aspects. Moreover, the present disclosure is not limited to arrangements, dimensions, dimensional ratios, and the like of each component illustrated in the drawings. It is to be noted that the description is given in the following order.

1. Embodiment (An example of an imaging device including an outer lens for each pixel and an inner lens for each photoelectric conversion section and further including a first separation section between adjacent photoelectric conversion sections inside a pixel and a second separation section, between adjacent pixels, protruding toward a light incident side)

2. Modification examples
 2-1. Modification Example 1 (An example in which a width of a first separation section and a width of second separation section are different)
 2-2. Modification Example 2 (An example in which a color filter including a plurality of types of transmission sections that transmit different wavelengths is provided and the position of an inner lens in a stacking direction is changed for each transmission section)
 2-3. Modification Example 3 (An example of including inner lenses of different curvatures depending on the position inside a unit pixel)
 2-4. Modification Example 4 (An example of changing an offset amount of an inner lens depending on the position of a photoelectric conversion section in a unit pixel)
 2-5. Modification Example 5 (An example of additionally providing a further inner lens between an outer lens and an inner lens)
 2-6. Modification Example 6 (An example of a front-illuminated imaging device)
3. Practical Application Examples 1. Embodiment FIG. 1 schematically illustrates an example of a cross-sectional configuration of an imaging device (an imaging device 1) according to an embodiment of the present disclosure. FIG. 2 illustrates an example of an overall configuration of the imaging device 1 illustrated in FIG. 1. The imaging device 1 is, for example, a CMOS (Complementary Metal Oxide Semiconductor) image sensor or the like to be used for an electronic apparatus such as a digital still camera or a video camera, and includes, as an imaging area, a pixel section (a pixel section 100A) in which a plurality of pixels are two-dimensionally arranged in matrix. The imaging device 1 is, for example, a so-called back-illuminated imaging device in the CMOS image sensor or the like.

The imaging device 1 of the present embodiment includes a pixel (a unit pixel P) that is able to acquire imaging information and parallax information simultaneously. The imaging device 1 of the present embodiment includes an inner lens 22L and an outer lens 24L on a side of a first surface 11S1, for example, of a semiconductor substrate 11 in which a plurality of photoelectric conversion sections 12 is provided for each unit pixel P. The inner lens 22L is disposed for each photoelectric conversion section 12, and the outer lens 24L is disposed for each unit pixel P. The imaging device 1 further includes a first separation section 13 that optically separates adjacent photoelectric conversion sections 12 from each other inside the unit pixel P, and a second separation section 14 that optically separates adjacent unit pixels P from each other. The second separation section 14 is provided to protrude toward a light incident side S1 farther than the first separation section 13.

The inner lens 22L corresponds to a specific example of a "second lens" of the present disclosure, and the outer lens 24L corresponds to a specific example of a "first lens" of the present disclosure. In addition, the first separation section 13 corresponds to a specific example of a "first separation section" of the present disclosure, and the second separation section 14 corresponds to a specific example of a "second separation section" of the present disclosure.

[Schematic Configuration of Imaging Device]

The imaging device 1 takes in incident light (image light) from a subject via an optical lens system (unillustrated), converts the amount of incident light formed as an image on an imaging surface into electric signals on a pixel-by-pixel basis, and outputs the electric signals as pixel signals. The imaging device 1 includes, on the semiconductor substrate 11, the pixel section 100A as an imaging area, and also includes, in a peripheral region of the pixel section 100A, for example, a vertical drive circuit 111, a column signal processing circuit 112, a horizontal drive circuit 113, an output circuit 114, a control circuit 115, and an input/output terminal 116.

In the pixel section 100A, for example, a plurality of unit pixels P are two-dimensionally arranged in matrix. The plurality of unit pixels P also serve as imaging pixels and image plane phase difference pixels. The imaging pixel photoelectrically converts a subject image formed by an imaging lens at a photodiode PD to generate signals for image generation. The image plane phase difference pixel divides a pupil region of the imaging lens, and photoelectrically converts a subject image from the divided pupil region to generate signals for phase difference detection.

The unit pixels P are provided, for example, with a pixel drive line Lread (specifically, a row selection line and a reset control line) for each of pixel rows, and provided with a vertical signal line Lsig for each of pixel columns. The pixel drive line Lread transmits drive signals for reading signals from the pixels. One end of the pixel drive line Lread is coupled to an output end of the vertical drive circuit 111 corresponding to each of the rows.

The vertical drive circuit 111 is a pixel drive section that is configured by a shift register, an address decoder, and the like, and drives the unit pixels P of the pixel section 100A on a row-by-row basis, for example. Signals outputted from the respective unit pixels P in the pixel rows selectively scanned by the vertical drive circuit 111 are supplied to the column signal processing circuit 112 through the respective vertical signal lines Lsig. The column signal processing circuit 112 is configured by an amplifier, a horizontal selection switch, and the like provided for each of the vertical signal lines Lsig.

The horizontal drive circuit 113 is configured by a shift register, an address decoder, and the like. The horizontal drive circuit 113 drives horizontal selection switches of the column signal processing circuit 112 in order while scanning the horizontal selection switches. The selective scanning by this horizontal drive circuit 113 causes signals of the respective pixels transmitted through the respective vertical signal lines Lsig to be outputted to a horizontal signal line 121 in order, and causes the signals to be transmitted to the outside of the semiconductor substrate 11 through the horizontal signal line 121.

The output circuit 114 performs signal processing on signals sequentially supplied from the respective column signal processing circuits 112 via the horizontal signal line 121, and outputs the signals. The output circuit 114 performs, for example, only buffering in some cases, and performs black level adjustment, column variation correction, various kinds of digital signal processing, and the like in other cases.

A circuit portion including the vertical drive circuit 111, the column signal processing circuit 112, the horizontal drive circuit 113, the horizontal signal line 121, and the output circuit 114 may be formed directly on the semiconductor substrate 11, or may be provided on an external control IC. In addition, the circuit portion may be formed on another substrate coupled by a cable or the like.

The control circuit 115 receives a clock supplied from the outside of the semiconductor substrate 11, data for an instruction about an operation mode, and the like, and also outputs data such as internal information on the imaging device 1. The control circuit 115 further includes a timing generator that generates a variety of timing signals, and controls driving of peripheral circuits including the vertical drive circuit 111, the column signal processing circuit 112, the horizontal drive circuit 113, and the like on the basis of the variety of timing signals generated by the timing generator.

The input/output terminal 116 exchanges signals with the outside.

[Circuit Configuration of Unit Pixel]

FIG. 3 illustrates an example of a readout circuit of the unit pixel P of the imaging device 1 illustrated in FIG. 2. As illustrated in FIG. 3, the unit pixel P includes, for example, two photoelectric conversion sections 12A and 12B, transfer transistors TR1 and TR2, a floating diffusion FD, a reset transistor RST, an amplification transistor AMP, and a selection transistor SEL.

The photoelectric conversion sections 12A and 12B are each a photodiode (PD). In the photoelectric conversion section 12A, an anode is coupled to a ground voltage line, and a cathode is coupled to a source of the transfer transistor TR1. In the photoelectric conversion section 12, similarly to the photoelectric conversion section 12A, an anode is coupled to the ground voltage line, and a cathode is coupled to a source of the transfer transistor TR2.

The transfer transistor TR1 is coupled between the photoelectric conversion section 12A and the floating diffusion FD. The transfer transistor TR2 is coupled between the photoelectric conversion section 12B and the floating diffusion FD. A drive signal TRsig is applied to each of gate electrodes of the transfer transistors TR1 and TR2. When the drive signal TRsig is brought into an active state, each of transfer gates of the transfer transistors TR1 and TR2 is brought into an electrically-conductive state, and signal charge accumulated in each of the photoelectric conversion sections 12A and 12B is transferred to the floating diffusion FD via the transfer transistors TR1 and TR2.

The floating diffusion FD is coupled between each of the transfer transistors TR1 and TR2 and the amplification transistor AMP. The floating diffusion FD subjects the signal charge transferred by the transfer transistors TR1 and TR2 to charge-voltage conversion into a voltage signal to output the converted voltage signal to the amplification transistor AMP.

The reset transistor RST is coupled between the floating diffusion FD and a power supply section. A drive signal RSTsig is applied to a gate electrode of the reset transistor RST. When the drive signal RSTsig is brought into an active state, a reset gate of the reset transistor RST is brought into an electrically-conductive state, and a potential of the floating diffusion FD is reset to a level of the power supply section.

The amplification transistor AMP, in which a gate electrode thereof is coupled to the floating diffusion FD and a drain electrode is coupled to the power supply section, serves as an input part of a readout circuit of the voltage signal held by the floating diffusion FD or a so-called source follower circuit. That is, a source electrode of the amplification transistor AMP is coupled to the vertical signal line Lsig via the selection transistor SEL to thereby configure the source follower circuit with a constant current source coupled to one end of the vertical signal line Lsig.

The selection transistor SEL is coupled between the source electrode of the amplification transistor AMP and the vertical signal line Lsig. A drive signal SELsig is applied to a gate electrode of the selection transistor SEL. When the drive signal SELsig is brought into an active state, the selection transistor SEL is brought into an electrically-conductive state, and the unit pixel P is brought into a selected state. This allows a readout signal (pixel signal) outputted from the amplification transistor AMP to be outputted to the vertical signal line Lsig via the selection transistor SEL.

In the unit pixel P, for example, the signal charge generated in the photoelectric conversion section 12A and the signal charge generated in the photoelectric conversion section 12B are read. The respective signal charges read from the photoelectric conversion section 12A and the photoelectric conversion section 12B are outputted to a phase difference calculation block of an external signal processing section, for example, to thereby acquire a signal for phase difference autofocus. In addition, the respective signal charges read from the photoelectric conversion section 12A and the photoelectric conversion section 12B are added together in the floating diffusion FD, and outputted to an imaging block of the external signal processing section, for example, to thereby acquire a pixel signal based on the total electric charge of the photoelectric conversion section 12A and the photoelectric conversion section 12B.

[Configuration of Unit Pixel]

FIG. 4 schematically illustrates an example of a planar configuration of the unit pixel P. As described above, the imaging device 1 is, for example, a back-illuminated imaging device; the unit pixels P, which are two-dimensionally arranged in the pixel section 100A, each have a configuration in which, for example, a light-receiving section 10, a light-condensing section 20 provided on the light incident side S1 of the light-receiving section 10, and a multilayer wiring layer 30 provided on a side opposite to the light incident side S1 of the light-receiving section 10 are stacked.

The light-receiving section 10 includes the semiconductor substrate 11 having the first surface 11S1 and a second surface 11S2 opposed to each other, and a plurality of photoelectric conversion sections 12 embedded and formed in the semiconductor substrate 11. The semiconductor substrate 11 is configured by, for example, a silicon substrate. The photoelectric conversion section 12 is, for example, a PIN (Positive Intrinsic Negative)-type photodiode (PD), and has a p-n junction at a predetermined region of the semiconductor substrate 11. As for the photoelectric conversion section 12, as described above, the plurality of (e.g., two) photoelectric conversion sections 12A and 12B are embedded and formed for each of the unit pixels P.

The light-receiving section 10 further includes the first separation section 13 and the second separation section 14.

The first separation section 13 is provided between the photoelectric conversion section 12A and the photoelectric conversion section 12B, which are adjacent to each other, inside the unit pixel P. The first separation section 13 is directed to optically separating the adjacent photoelectric conversion section 12A and photoelectric conversion section 12B from each other, and extends through the first surface 11S1 and the second surface 11S2 of the semiconductor substrate 11, for example.

The first separation section 13 is formed by, for example, an electrically-conductive film having a light-blocking property extending through the first surface 11S1 and the second surface 11S2 of the semiconductor substrate 11, and an insulating film provided between the electrically-conductive film and the semiconductor substrate 11. Examples of the electrically-conductive film having a light-blocking property include a single-layer film or a stacked film such as tungsten (W), silver (Ag), copper (Cu) or aluminum (Al), or an alloy of Al and copper (Cu). Examples of the insulating film include a silicon oxide ($SiO_x$) film.

The second separation section 14 is provided between unit pixels P adjacent to each other. In other words, the second separation section 14 is provided around the unit pixel P, and is provided in a lattice pattern, for example, in the pixel section 100A. The second separation section 14 is directed to optically separate the adjacent unit pixels P from each other, and extends from the side of the first surface 11S1 of the semiconductor substrate 11 toward a side of the second surface 11S2 thereof, for example. Further, the second separation section 14 protrudes from the first surface 11S1 toward the light incident side S1, and extends into the light-condensing section 20. Specifically, the second separation section 14 extends from the second surface 11S2 of the semiconductor substrate 11 to an outer lens layer 24 provided in the light-condensing section 20.

Similarly to the first separation section 13, the second separation section 14 is formed by, for example, an electrically-conductive film having a light-blocking property and an insulating film provided around the electrically-conductive film. Examples of the electrically-conductive film having a light-blocking property include a single-layer film or a stacked film such as tungsten (W), silver (Ag), copper (Cu) or aluminum (Al), or an alloy of Al and copper (Cu). Examples of the insulating film include a silicon oxide ($SiO_x$) film.

It is to be noted that the first separation section 13 and the second separation section 14 may not necessarily penetrate the semiconductor substrate 11, and ends of the first separation section 13 and the second separation section 14 may be formed inside the semiconductor substrate 11 on the side of the second surface 11S2, for example. In other words, the adjacent photoelectric conversion sections 12A and 12B or the adjacent unit pixels P may be coupled to each other by the semiconductor substrate 11 on the side of the second surface 11S2 of the semiconductor substrate 11. Further, the second separation section 14 extending into the light-condensing section 20 may be formed using a material other than that for the second separation section 14 provided in the light-receiving section 10.

In addition, FIG. 4 exemplifies the unit pixel P including the two photoelectric conversion sections 12A and 12B; however, the number of the photoelectric conversion sections 12 inside the unit pixel P is not limited thereto. The unit pixel P may be provided with three or more photoelectric conversion sections 12; for example, as illustrated in FIG. 5, four photoelectric conversion sections 12A, 12B, 12C, and 12D arranged in two rows by two columns may be provided.

The light-condensing section 20 is provided on the light incident side S1 of the light-receiving section 10. The light-condensing section 20 includes, for example, a protective layer 21 that covers the first surface 11S1 of the semiconductor substrate 11, an inner lens layer 22, and an embedded layer 23, and the outer lens layer 24, which are stacked in this order from a side of the light-receiving section 10.

The protective layer 21 is directed to protecting the first surface 11S1 of the semiconductor substrate 11 and planarizing the surface. The protective layer 21 is formed using, for example, silicon oxide ($SiO_x$), silicon nitride ($SiN_x$), silicon oxynitride ($SiO_xN_y$), or the like.

The inner lens layer 22 is provided, for example, to cover the entire surface of the pixel section 100A, and includes, on a surface thereof, a plurality of inner lenses 22L provided in a gapless manner, for example. The inner lens 22L is directed to guiding incident light from above to the photoelectric conversion section 12, and is provided, for example, for each of the photoelectric conversion sections 12 (e.g., photoelectric conversion sections 12A and 12B), as illustrated in FIG. 4. The inner lens layer 22 including the inner lens 22L is formed using a material having a high refractive index, for example, and is specifically formed using an inorganic material such as silicon oxide ($SiO_x$) or silicon nitride ($SiN_x$), for example. In addition thereto, the inner lens layer 22 may be formed using an organic material having a high refractive index such as an episulfide-based resin and a thietane compound or a resin thereof. The shape of the inner lens 22L is not particularly limited, and various lens shapes such as a hemispherical shape and a semi-cylindrical shape can be adopted.

The embedded layer 23 is directed to keeping an interval between the inner lens layer 22 and the outer lens layer 24. The embedded layer 23 is formed using, for example, silicon oxide ($SiO_x$), silicon nitride ($SiN_x$), silicon oxynitride ($SiO_xN_y$), and the like.

Similarly to the inner lens layer 22, the outer lens layer 24 is provided to cover the entire surface of the pixel section 100A, for example, and includes, on a surface thereof, a plurality of outer lenses 24L. The outer lens 24L is directed to condense incident light from above on the inner lens 22L, and is provided for each of the unit pixels P, for example, as illustrated in FIG. 4. Similarly to the inner lens layer 22, the outer lens layer 24 including the outer lens 24L is formed using, for example, a material having a high refractive index, and is formed specifically using an inorganic material such as silicon oxide ($SiO_x$) or silicon nitride ($SiN_x$), for example. In addition thereto, the outer lens layer 24 may be formed using an organic material having a high refractive index such as an episulfide-based resin and a thietane compound, or a resin thereof. The shape of the outer lens 24L is not particularly limited, and various lens shapes such as a hemispherical shape and a semi-cylindrical shape can be adopted.

The multilayer wiring layer 30 is provided on a side opposite to the light incident side S1 of the light-receiving section 10. The multilayer wiring layer 30 has a configuration, for example, in which a plurality of wiring layers 31, 32, and 33 are stacked with an interlayer insulating layer 34 interposed therebetween. In addition to the readout circuit described above, the multilayer wiring layer 30 includes, for example, the vertical drive circuit 111, the column signal processing circuit 112, the horizontal drive circuit 113, the output circuit 114, the control circuit 115, the input/output terminal 116, and the like.

The wiring layers 31, 32, and 33 are each formed using, for example, aluminum (Al), copper (Cu), tungsten (W), or the like. In addition thereto, the wiring layers 31, 32, and 33 may each be formed using polysilicon (Poly-Si).

The interlayer insulating layer 34 is formed by, for example, a single-layer film including one of silicon oxide ($SiO_x$), TEOS, silicon nitride ($SiN_x$), silicon oxynitride ($SiO_xN_y$), or the like, or a stacked film including two or more thereof.

[Workings and Effects]

In the imaging device 1 of the present embodiment, the outer lens 24L is disposed for each of the unit pixels P on the side of the first surface 11S1 of the semiconductor substrate 11 including the plurality of photoelectric conversion sections 12 (e.g., photoelectric conversion sections 12A and 12B) inside the unit pixel P, and the respective inner lenses 22L are disposed for the photoelectric conversion sections 12A and 12B between the first surface 11S1 of the semiconductor substrate 11 and the outer lens 24L. Further, the first separation section 13 is provided between the adjacent photoelectric conversion sections 12A and 12B inside the unit pixel P, and the second separation section 14 protruding toward the light incident side S1 farther than the first separation section 13 is provided between the adjacent unit pixels P. This allows for a reduction in occurrence of a crosstalk between the adjacent photoelectric conversion sections 12A and 12B while causing light incident on the unit pixel P to enter the photoelectric conversion sections 12A and 12B corresponding to incident angles. This is described below.

In recent years, a semiconductor imaging device (imaging device) has become popular that has a focus detection function using a phase difference detection method. In such an imaging device, each pixel has a plurality of photodiodes. Sharing one microlens with the plurality of photodiodes enables simultaneous acquisition of imaging information and parallax information.

As described above, the imaging device in which one microlens is shared by the plurality of photodiodes performs sensing by separating incident light depending on a predetermined incident angle. However, there is an issue of occurrence of a crosstalk in the vicinity of an angle at which the light is desired to be separated.

As described above, as a solution to this issue, the imaging device has been reported that achieves acquisition of an appropriate image corresponding to a light receiving amount and an improvement in focus detection accuracy by enhancing pupil separation as a result of extension of a separation section in a direction toward the center of the pixel. In this imaging device, however, enhancing the extension of the separation section causes the quality of a captured image to be deteriorated, whereas reducing the extension causes pupil separation performance to be lowered, thus making it difficult to achieve both the imaging performance and the pupil separation performance.

In contrast, in the present embodiment, the outer lens 24L is disposed for each of the unit pixels P on the side of the first surface 11S1 of the semiconductor substrate 11 including the plurality of photoelectric conversion sections 12 (e.g., photoelectric conversion sections 12A and 12B) inside the unit pixel P, and the respective inner lenses 22L are disposed for the photoelectric conversion sections 12A and 12B between the first surface 11S1 of the semiconductor substrate 11 and the outer lens 24L. Specifically, the outer lens 24L is disposed to focus on the inner lens 22L; light (e.g., light L1, L2, or L3) incident on the outer lens 24L is first incident on a corresponding inner lens 22L depending on its incident angle and subjected to pupil separation as illustrated in FIG. 1, for example, and then guided, by the inner lens 22L, to the photoelectric conversion section 12A or the photoelectric conversion section 12B, which are disposed below. Accordingly, as in the light L3, light incident on the vicinity of a boundary between the adjacent inner lenses 22L disposed above the photoelectric conversion sections 12A and 12B is also efficiently guided to the photoelectric conversion section 12A or the photoelectric conversion section 12B disposed below the inner lens 22L on which the light has been incident.

Further, in the present embodiment, the first separation section 13 penetrating through the first surface 11S1 and the second surface 11 S2 of the semiconductor substrate 11, for example, is provided between the photoelectric conversion sections 12A and 12B adjacent to each other in the unit pixel P. The second separation section 14 extending from the side of the first surface 11S1 toward the side of the second surface 11S2 of the semiconductor substrate 11 and further extending toward the light incident side S1 to reach the outer lens 24L is provided between the adjacent unit pixels P. This allows for a reduction in occurrence of a crosstalk between the adjacent photoelectric conversion sections 12, in particular, between the adjacent photoelectric conversion sections 12A and 12B inside the unit pixel P.

As described above, it is possible, in the imaging device 1 of the present embodiment, to reduce occurrence of a crosstalk between the adjacent photoelectric conversion sections 12A and 12B while causing light incident on the unit pixel P to enter the photoelectric conversion sections 12A and 12B corresponding to incident angles. That is, it is possible to improve imaging performance while improving pupil separation performance.

In addition, in the present embodiment, as described above, the outer lens 24L is focused on the inner lens 22L, thus making it possible to improve sensitivity as compared with a case where the outer lens 24L is focused on the first surface 11S1 or the inside of the semiconductor substrate 11 as in a typical imaging device. That is, it is possible to further improve the imaging performance.

Next, description is given of Modification Examples 1 to 6 of the present disclosure. Hereinafter, components similar to those of the foregoing embodiment are denoted by the same reference numerals, and descriptions thereof are omitted as appropriate.

2. Modification Examples

2-1. Modification Example 1

FIG. 6 schematically illustrates an example of a cross-sectional configuration of an imaging device (an imaging device 1A) according to Modification Example 1 of the present disclosure. The imaging device 1A is a CMOS image sensor or the like to be used, for example, in an electronic apparatus such as a digital still camera or a video camera. Similarly to the foregoing embodiment, the imaging device 1A is, for example, a so-called back-illuminated imaging device.

The foregoing embodiment exemplifies the first separation section 13 and the second separation section 14 being formed to have substantially the same width. However, as illustrated in FIG. 6, for example, a width W1 of the first separation section 13 may be formed to be smaller than a width W2 of the second separation section 14 (W1<W2). This allows for a reduction in occurrence of scattered light as well as suppression of a decrease in sensitivity caused by exposure of the first separation section 13 to light not having been fully avoided by the inner lens 22L. Thus, it is possible to further improve the imaging performance while improving the pupil separation performance.

2-2. Modification Example 2

Figure 7:
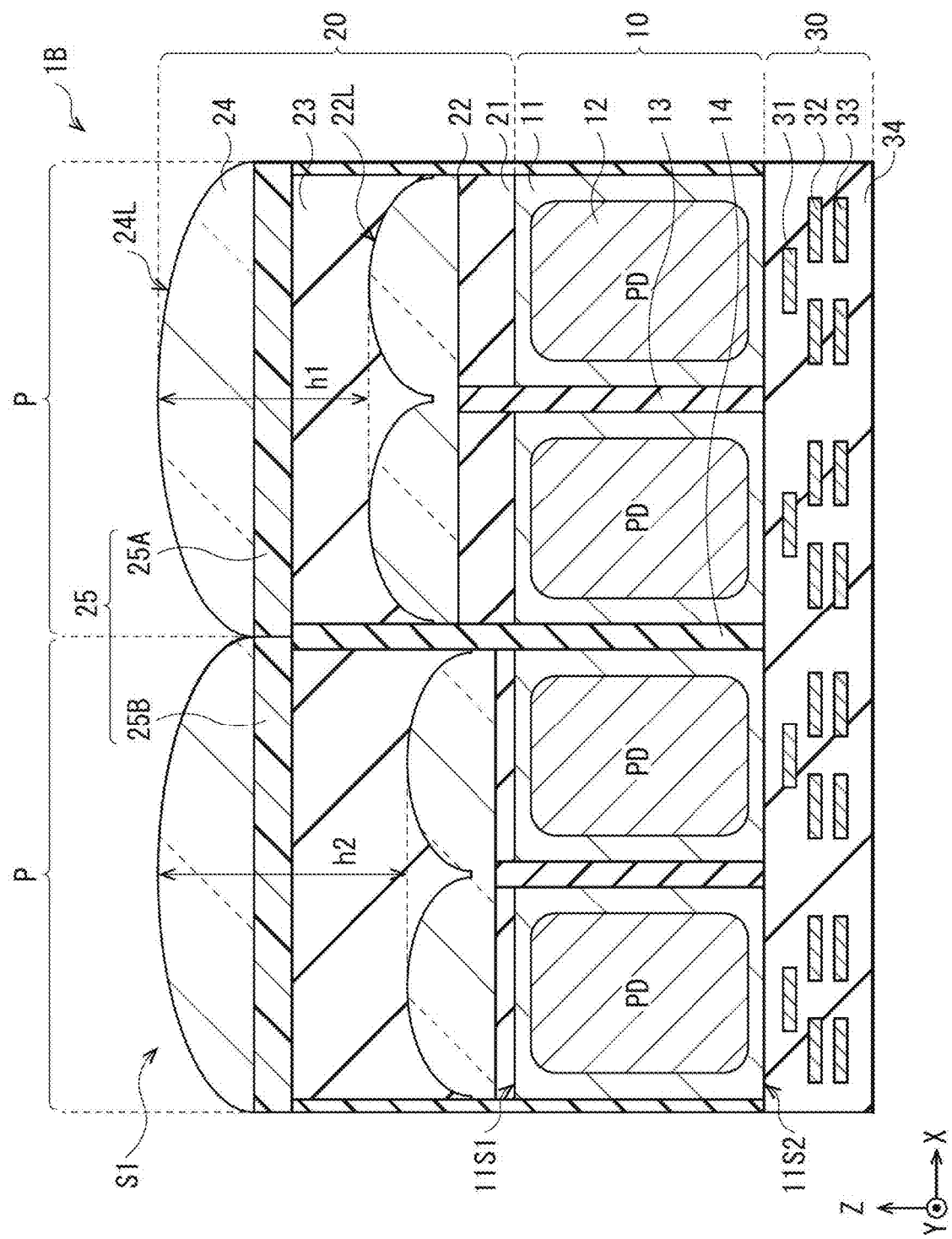
FIG. 7 is a schematic cross-sectional view of an example of a configuration of an imaging device according to Modification Example 2 of the present disclosure.

FIG. 7 schematically illustrates an example of a cross-sectional configuration of an imaging device (an imaging device 1B) according to Modification Example 2 of the present disclosure. The imaging device 1B is a CMOS image sensor or the like to be used, for example, in an electronic apparatus such as a digital still camera or a video camera. Similarly to the foregoing embodiment, the imaging device 1B is, for example, a so-called back-illuminated imaging device. The present modification example differs from the foregoing embodiment in that a color filter 25 selectively transmitting, for example, red light (R), green light (G), or blue light (B) is provided, for each of the unit pixels P, between the embedded layer 23 and the outer lens layer 24 of the light-condensing section 20, for example, and that a distance between a lens surface of the outer lens 23L and a lens surface of the inner lens 22L is changed in accordance with a wavelength of the light transmitted through the color filter 25.

For example, the color filter 25 includes a transmission section 25A that selectively transmits light of a predetermined wavelength region, and a transmission section 25B that selectively transmits light of a longer wavelength than light transmitted through the transmission section 25A. In the imaging device 1B, the transmission section 25A is disposed in a unit pixel P1, and the transmission section 25B is disposed in a unit pixel P2. The distances in the unit pixel P1 and the unit pixel P2 between the lens surface of the outer lens 23L and the lens surface of the inner lens 22L differ from each other. Specifically, the protective layer 21 covering the first surface 11S1 of the semiconductor substrate 11 in the unit pixel P1 is made thicker than the protective layer 21 covering the first surface 11S1 of the semiconductor substrate 11 in the unit pixel P2 to allow a distance h1 between the lens surface of the outer lens 23L and the lens surface of the inner lens 22L in the unit pixel P1 to be made smaller than a distance h2 between the lens surface of the outer lens 23L and the lens surface of the inner lens 22L in the unit pixel P2 (h1<h2).

The position of focus of light condensed on the inner lens 22L by the outer lens 24L differs depending on the wavelength of the light. Specifically, the shorter wavelength has a shorter focus position, whereas the longer wavelength has a longer focus position.

For this reason, as in the imaging device 1B of the present modification example, in a case of providing, for each of the unit pixels P, the color filter 25 including the transmission sections (e.g., transmission sections 25A and 25B) that selectively transmit light beams of predetermined wavelengths, it is preferable to change the distance between the outer lens 24L and the inner lens 22L, i.e., the distance between the first surface 11S1 of the semiconductor substrate 11 and the lens surface of the inner lens 22L, depending on the wavelength of transmitted light. This makes it possible, also in the imaging device 1B that acquires a plurality of types of color signals using the color filter 25, to improve the imaging performance while improving the pupil separation performance, similarly to the foregoing embodiment.

In addition, as in the present modification example, in a case where the distance between the first surface 11S1 of the semiconductor substrate 11 and the lens surface of the inner lens 22L varies depending on the color filter 25 to be disposed, it is preferable to cause the first separation section 13 to protrude toward the light incident side S1 depending on the distance between the first surface 11S1 of the semiconductor substrate 11 and the lens surface of the inner lens 22L, as illustrated in FIG. 7. Specifically, for example, as in the unit pixel P1 illustrated in FIG. 7, in a case where the distance between the first surface 11S1 of the semiconductor substrate 11 and the inner lens 22L is wide, it is preferable to extend the first separation section 13 into the protective layer 21 between the first surface 11S1 of the semiconductor substrate 11 and the inner lens 22L. Accordingly, also in a case where the distance between the first surface 11S1 of the semiconductor substrate 11 and the lens surface of the inner lens 22L becomes wider, it is possible to improve the imaging performance while improving the pupil separation performance.

2-3. Modification Example 3

Figure 8:
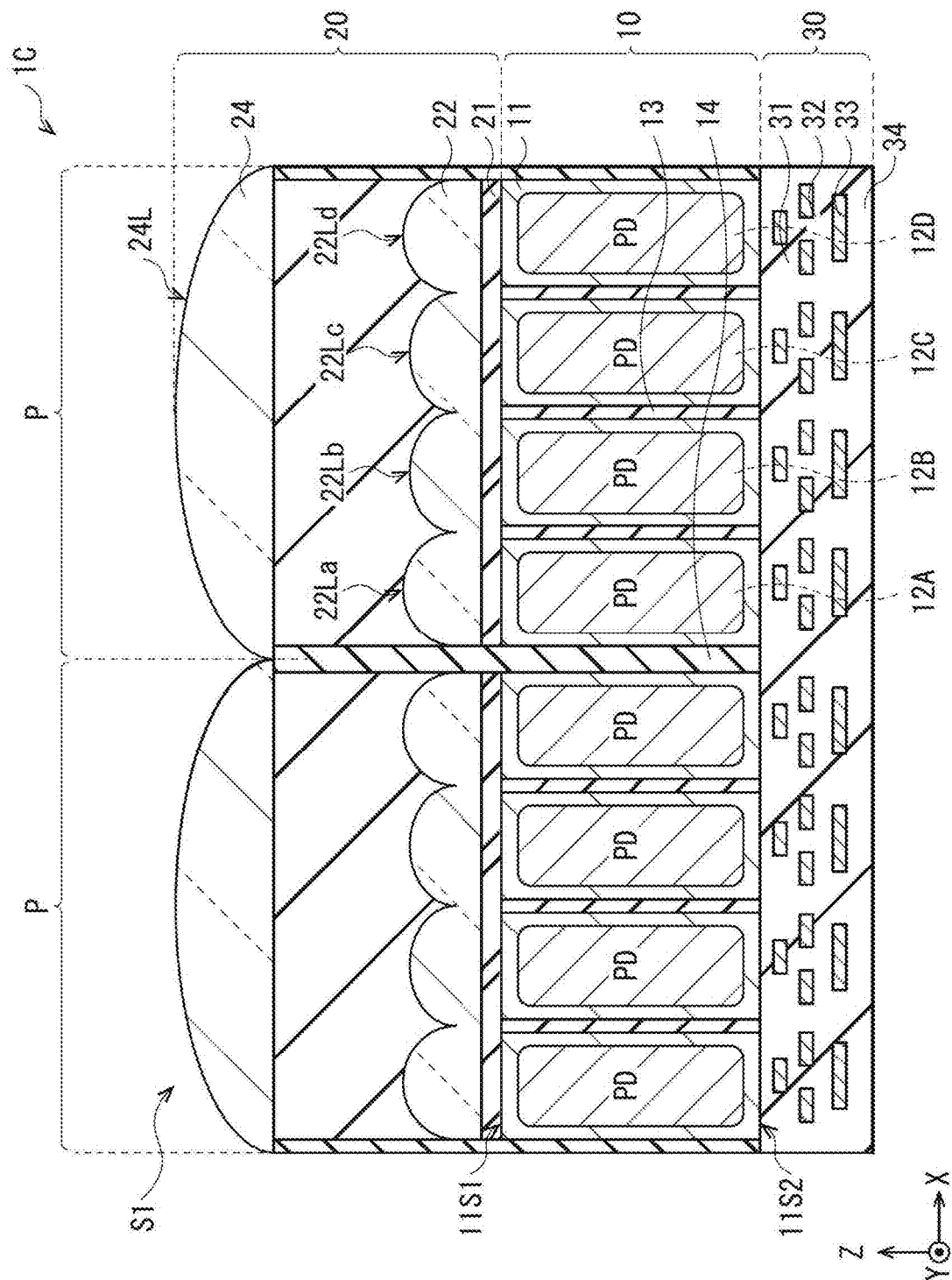
FIG. 8 is a schematic cross-sectional view of an example of a configuration of an imaging device according to Modification Example 3 of the present disclosure.

FIG. 8 schematically illustrates an example of a cross-sectional configuration of an imaging device (an imaging device 1C) according to Modification Example 3 of the present disclosure. The imaging device 1C is a CMOS image sensor or the like to be used, for example, in an electronic apparatus such as a digital still camera or a video camera. Similarly to the foregoing embodiment, the imaging device 1C is, for example, a so-called back-illuminated imaging device. The present modification example differs from the foregoing embodiment in that three or more photoelectric conversion sections 12 are provided inside the unit pixel P, for example, in a row direction and/or a column direction and that a curvature of the inner lens 22L disposed for each of the photoelectric conversion sections 12 is changed depending on the positions thereof inside the unit pixel P.

In the present modification example, four photoelectric conversion sections 12A, 12B, 12C, and 12D are provided, for example, in an X-axis direction inside the unit pixel P. Inner lenses 22La, 22Lb, 22Lc, and 22Ld are arranged, respectively, above the photoelectric conversion sections 12A, 12B, 12C, and 12D. As for these four inner lenses 22La, 22Lb, 22Lc, and 22Ld, the lens located closer to a peripheral part of the unit pixel P has a larger curvature. Specifically, lens surfaces of the inner lenses 22La and 22Ld arranged above the photoelectric conversion sections 12A and 12D provided in the peripheral part of the unit pixel P each have a curvature larger than that of each of lens surfaces of the inner lenses 22Lb and 22Lc arranged above the photoelectric conversion sections 12B and 12C adjacent to the center part.

Thus, in the imaging device 1C of the present modification example, for example, in the unit pixel provided with three or more photoelectric conversion sections 12 in the row direction and/or the column direction, the curvatures of the inner lenses 22L arranged for each of the photoelectric conversion sections 12 are changed depending on the positions thereof inside the unit pixel P. This makes it possible to improve light-condensing performance. Thus, it is possible to further improve the imaging performance while improving the pupil separation performance.

2-4. Modification Example 4

Figure 9:
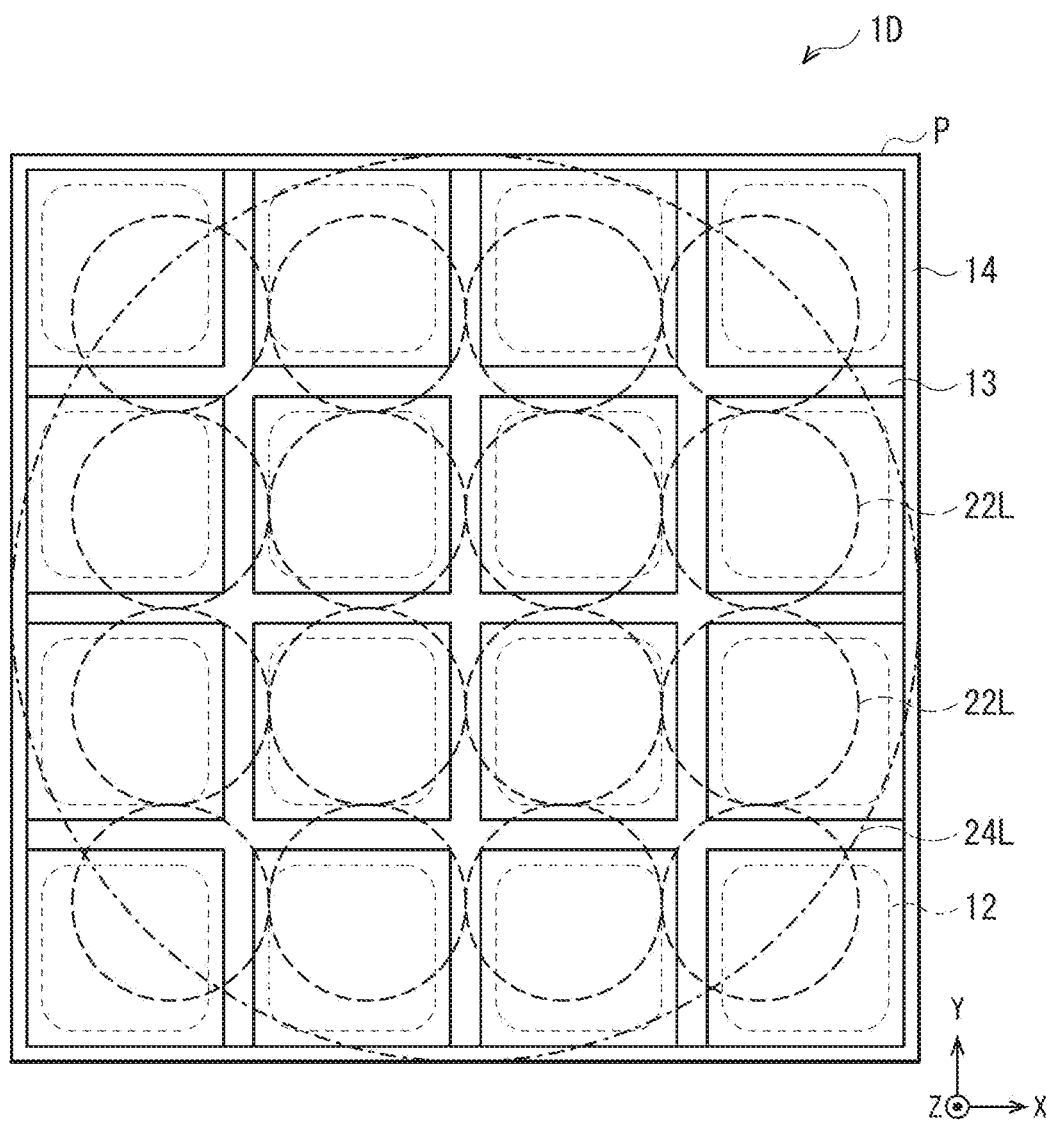
FIG. 9 is a schematic plan view of an example of a layout of a photoelectric conversion section, an inner lens, and an outer lens in a unit pixel of an imaging device according to Modification Example 4 of the present disclosure.

FIG. 9 schematically illustrates an example of a planar configuration of an imaging device (an imaging device 1D) according to Modification Example 4 of the present disclosure. The imaging device 1D is a CMOS image sensor or the like to be used, for example, in an electronic apparatus such as a digital still camera or a video camera. Similarly to the foregoing embodiment, the imaging device 1D is, for example, a so-called back-illuminated imaging device. The present modification example differs from the foregoing embodiment in that three or more photoelectric conversion sections 12 are provided inside the unit pixel P, for example, in the row direction and/or the column direction and that the offset amounts of the inner lenses 22L provided for the respective photoelectric conversion sections 12 are changed depending on the positions thereof inside the unit pixel P.

In the present modification example, for example, in the unit pixel P, 16 photoelectric conversion sections 12 are arranged in array in four rows and four columns in the X-axis direction (e.g., row direction) and a Y-axis direction (e.g., column direction). Inside the unit pixel P, 16 inner lenses 22L are provided in a manner corresponding to the 16 photoelectric conversion sections 12. As for these 16 inner lenses 22L, the lens located closer to the peripheral part of the unit pixel P has a larger offset amount toward the center part of the unit pixel P.

Thus, in the imaging device 1D of the present modification example, for example, in the unit pixel P provided with the three or more photoelectric conversion sections 12 in the row direction and/or the column direction, the offset amounts of the inner lenses 22L arranged for the respective photoelectric conversion sections 12 are changed depending on the positions thereof inside the unit pixel P. This makes it possible to improve the light-condensing performance. Thus, it is possible to further improve the imaging performance while improving the pupil separation performance.

2-5. Modification Example 5

Figure 10:
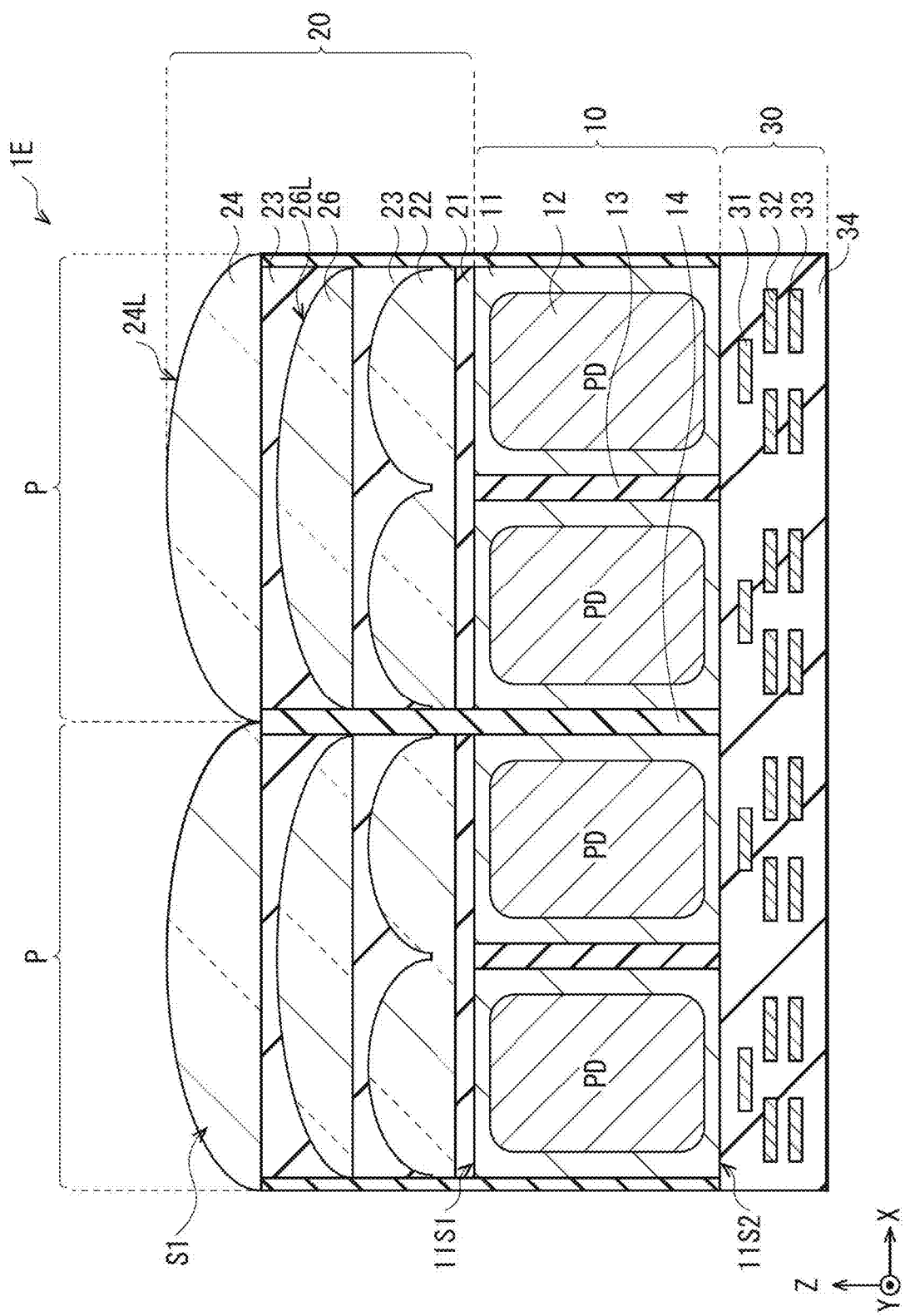
FIG. 10 is a schematic cross-sectional view of an example of a configuration of an imaging device according to Modification Example 5 of the present disclosure.

FIG. 10 schematically illustrates an example of a cross-sectional configuration of an imaging device (an imaging device 1E) according to Modification Example 5 of the present disclosure. The imaging device 1E is a CMOS image sensor or the like to be used, for example, in an electronic apparatus such as a digital still camera or a video camera. The present modification example differs from the foregoing embodiment in that an inner lens layer 26 is further disposed between the inner lens layer 22 and the outer lens layer 24.

Similarly to the above-described inner lens layer 22, the inner lens layer 26 is provided to cover the entire surface of the pixel section 100A, for example, and includes, on a surface thereof, a plurality of inner lenses 26L. The inner lens 26L is directed to assisting the outer lens 24L in condensing light, and is provided for each of the unit pixels P, for example, as illustrated in FIG. 4. The inner lens layer 26 including the inner lenses 26L is formed using, for example, a material having a high refractive index, and is formed specifically by an inorganic material such as silicon oxide ($SiO_x$) or silicon nitride ($SiN_x$), for example. In addition thereto, an organic material having a high refractive index such as an episulfide-based resin and a thiethane compound, or a resin thereof may be used for the inner lens layer 26. The shape of the inner lens 26L is not particularly limited, and various lens shapes such as a hemispherical shape and a semi-cylindrical shape can be adopted.

As described above, in the present modification example, the inner lens layer 26 is further provided between the inner lens layer 22 and the outer lens layer 24 to assist the outer lens 24L in condensing light on the inner lens 22L. This makes it possible to reduce the height of the light-condensing section 20, as compared with the imaging device 1 of the foregoing embodiment. Thus, it is possible, in the imaging device 1E of the present modification example, to achieve an effect of improving oblique incidence characteristics, in addition to the effects of the foregoing embodiment.

2-6. Modification Example 6

Figure 11:
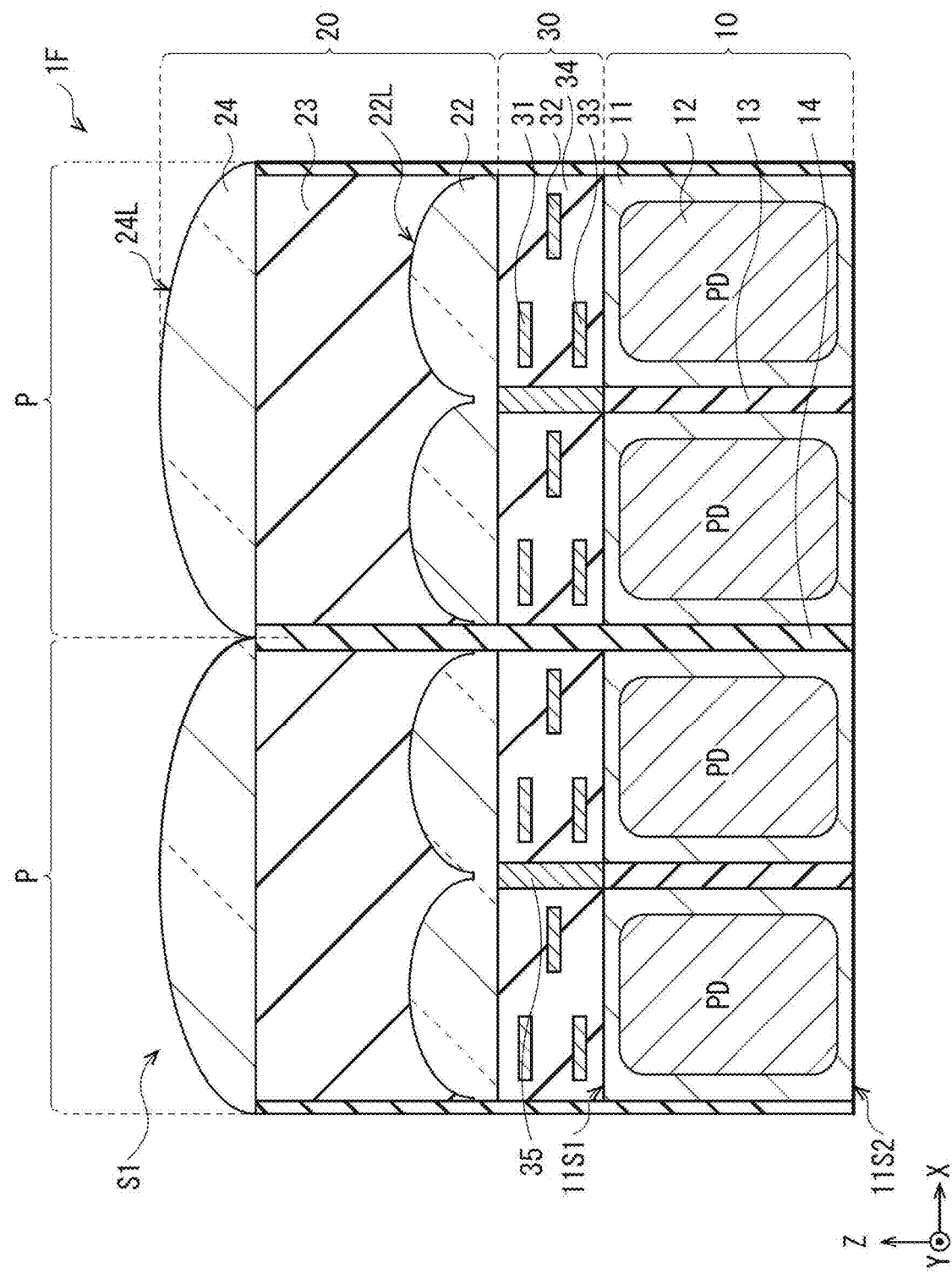
FIG. 11 is a schematic cross-sectional view of an example of a configuration of an imaging device according to Modification Example 6 of the present disclosure.

FIG. 11 schematically illustrates an example of a cross-sectional configuration of an imaging device (an imaging device 1F) according to Modification Example 6 of the present disclosure. The imaging device 1F is a CMOS image sensor or the like to be used, for example, in an electronic apparatus such as a digital still camera or a video camera. The imaging device 1F of the present modification example is a so-called front-illuminated imaging device in which the multilayer wiring layer 30 is provided on the light incident side S1 of the light-receiving section 10.

As described above, the present technology is applicable not only to the back-illuminated imaging device but also to the front-illuminated imaging device, thus making it possible to improve the imaging performance while improving the pupil separation performance, similarly to the foregoing embodiment.

It is to be noted that, in a case where the multilayer wiring layer 30 is provided on the light incident side S1 as in the present modification example, it is preferable to extend the first separation section 13 into the multilayer wiring layer 30, similarly to the foregoing Modification Example 2. This makes it possible to enhance the imaging performance as well as a decrease in the pupil separation performance. The first separation section 13 and the second separation section 14 extending into the multilayer wiring layer 30 may be partially formed using, for example, the wiring layer 31, 32, or 33 formed inside the multilayer wiring layer 30, or may be partially formed using, for example, a waveguide.

3. Practical Application Examples (Example of Practical Application to Mobile Body)

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an aircraft, a drone, a vessel, or a robot.

Figure 12:
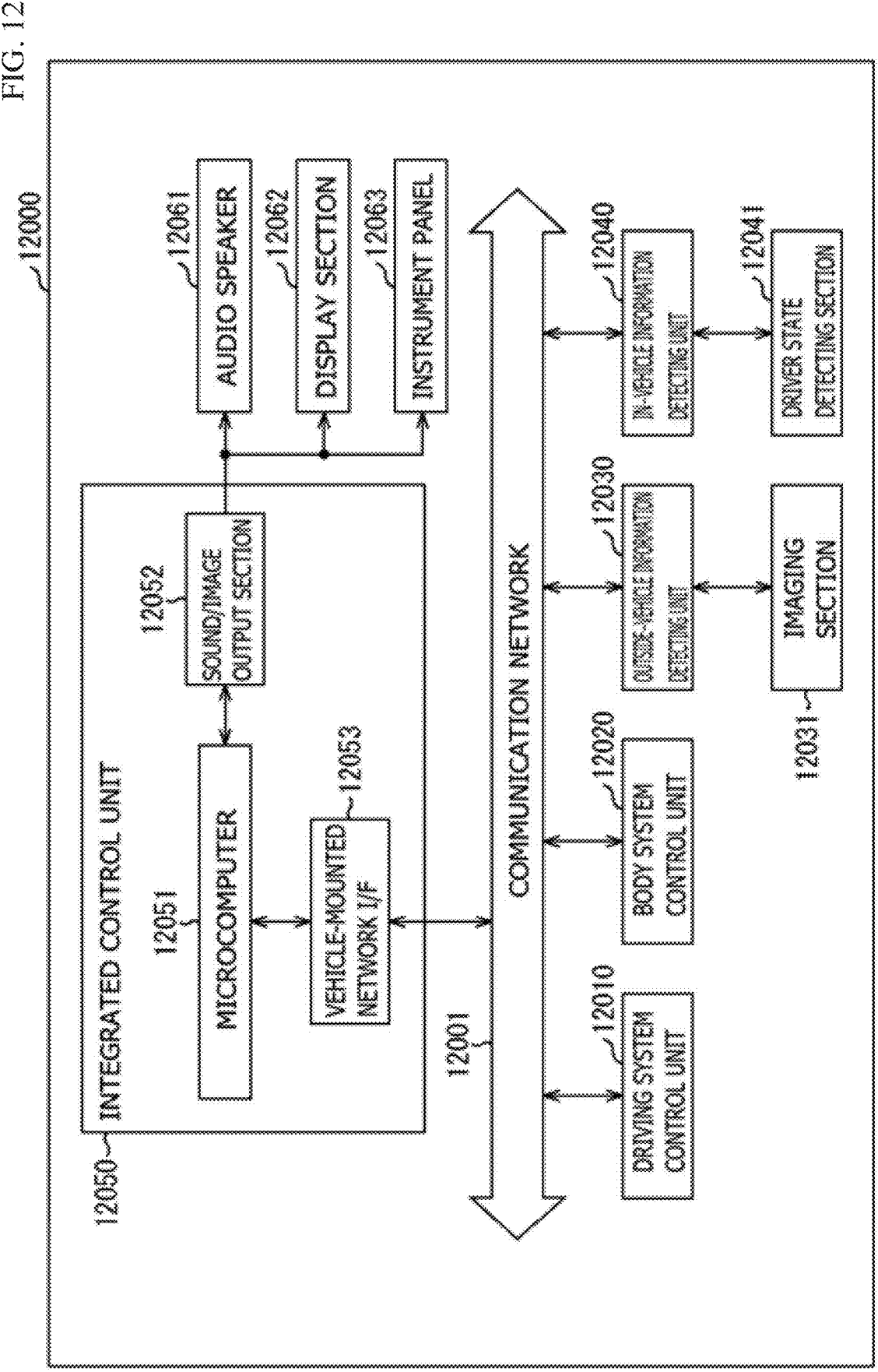
FIG. 12 is a block diagram depicting an example of schematic configuration of a vehicle control system.

FIG. 12 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 12, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 57, an audio speaker 12061, a display section 12062, and an instrument panel 12063 are illustrated as the output device. The display section 12062 may, for example, include at least one of an on-board display and a head-up display.

Figure 13:
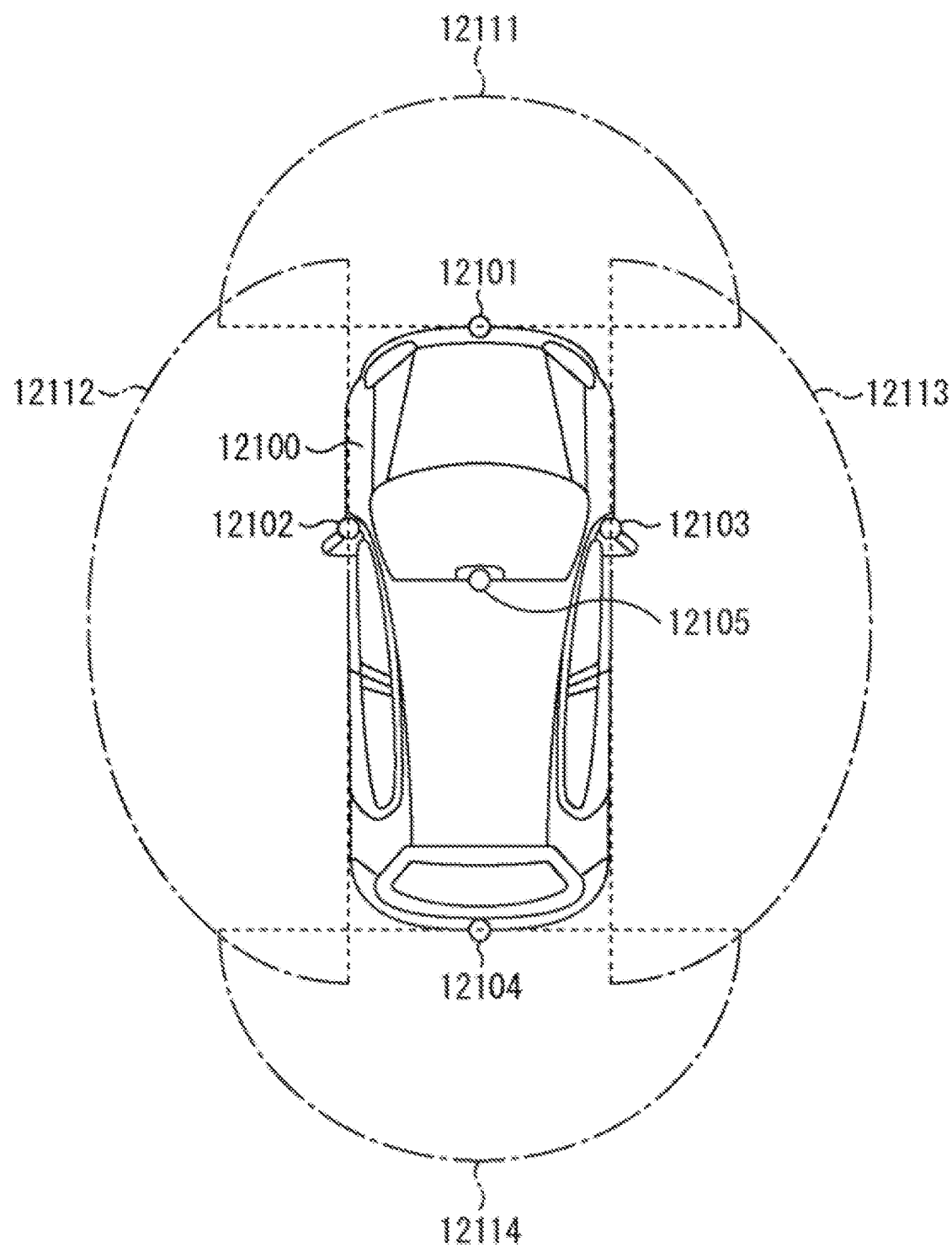
FIG. 13 is a diagram of assistance in explaining an example of installation positions of an outside-vehicle information detecting section and an imaging section.

FIG. 13 is a diagram depicting an example of the installation position of the imaging section 12031.

In FIG. 13, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 13 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging devices, or may be an imaging device having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The description has been given hereinabove of one example of the mobile body control system, to which the technology according to an embodiment of the present disclosure may be applied. The technology according to an embodiment of the present disclosure may be applied to the imaging section 12031 among components of the configuration described above. Specifically, the imaging device 100 is applicable to the imaging section 12031. The application of the technology according to an embodiment of the present disclosure to the imaging section 12031 allows for a high-definition captured image with less noise, thus making it possible to perform highly accurate control utilizing the captured image in the mobile body control system.

(Example of Practical Application to Endoscopic Surgery System)

The technology according to an embodiment of the present disclosure (present technology) is applicable to various products. For example, the technology according to an embodiment of the present disclosure may be applied to an endoscopic surgery system.

Figure 14:
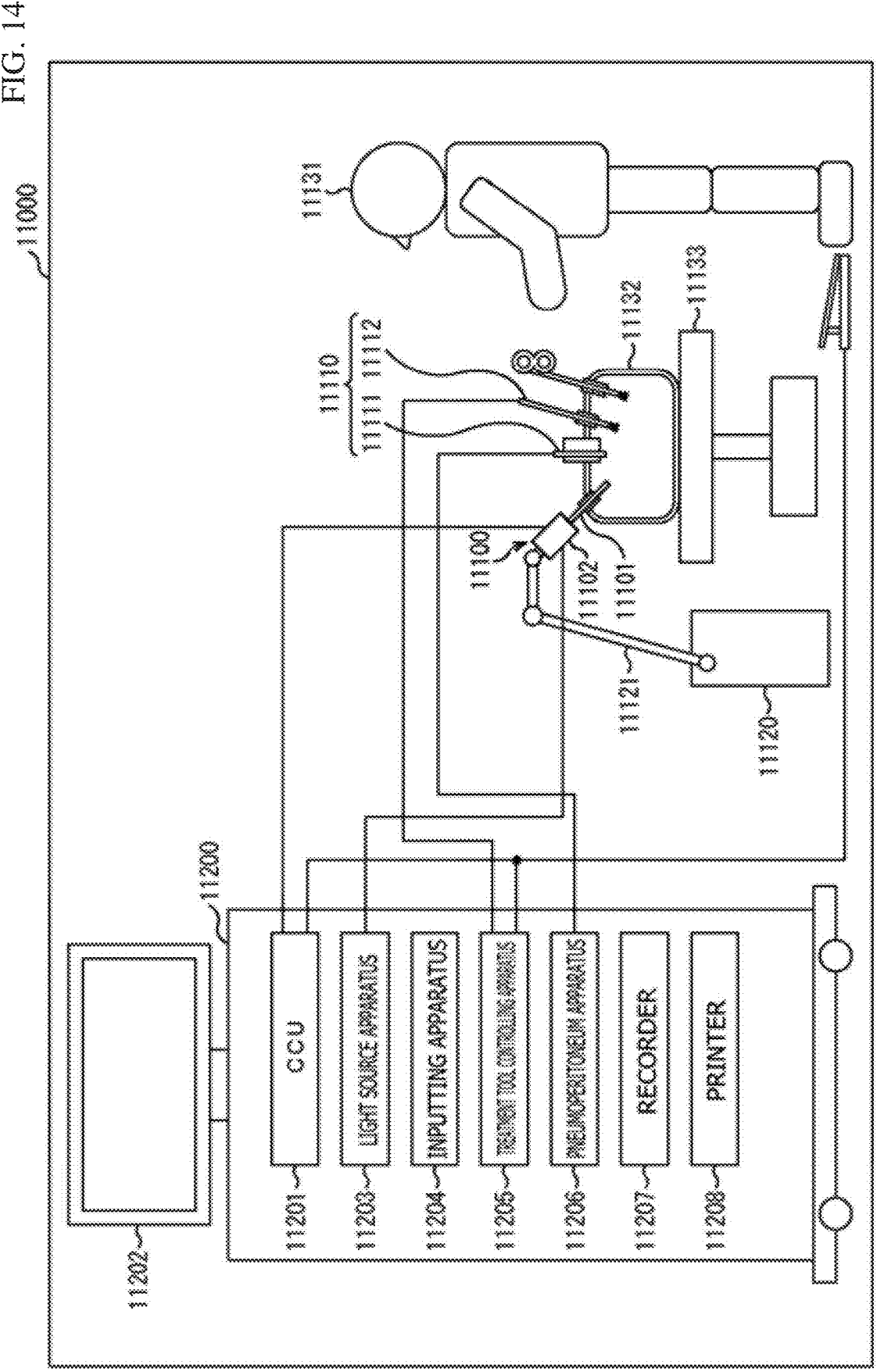
FIG. 14 is a view depicting an example of a schematic configuration of an endoscopic surgery system.

FIG. 14 is a view depicting an example of a schematic configuration of an endoscopic surgery system to which the technology according to an embodiment of the present disclosure (present technology) can be applied.

In FIG. 14, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 15 is a block diagram depicting an example of a functional configuration of the camera head 11102 and the CCU 11201 depicted in FIG. 14.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

The description has been given above of one example of the endoscopic surgery system, to which the technology according to an embodiment of the present disclosure is applicable. The technology according to an embodiment of the present disclosure is applicable to the image pickup unit 11402, provided in the camera head 11102 of the endoscope 11100, of the configurations described above. Applying the technology according to an embodiment of the present disclosure to the image pickup unit 11402 enables the image pickup unit 11402 to have a smaller size or higher definition property, thus making it possible to provide the small-sized or high-definition endoscope 11100.

Description has been given hereinabove referring to the embodiment, Modification Examples 1 to 6, and Practical Application Examples; however, the present technology is not limited to the foregoing embodiment and the like, and may be modified in a wide variety of ways. For example, the foregoing Modification Example 5 has exemplified the addition of one inner lens 26L between the inner lens 22L and the outer lens 24L; however, two or more inner lenses may be additionally provided.

It is to be noted that the effects described herein are merely exemplary and should not be limited to the description, and may further include other effects.

It is to be noted that the present disclosure may also have the following configuration. According to the present technology of the following configurations, a first lens is disposed for each of pixels on a side of a light incident surface of a semiconductor substrate in which a plurality of pixels are arranged in matrix and which includes a plurality of photoelectric conversion sections for each of the pixels, and a second lens is disposed between a first surface of the semiconductor substrate and the first lens for each of the photoelectric conversion sections. Further, there are provided: a first separation section optically separating adjacent photoelectric conversion sections from each other in the pixel; and a second separation section optically separating adjacent pixels from each other and protruding farther than the first separation section in a light incident direction. This allows for a reduction in occurrence of a crosstalk between the adjacent photoelectric conversion sections while causing light incident on a pixel to enter the photoelectric conversion section corresponding to an incident angle. Thus, it is possible to improve the imaging performance while improving the pupil separation performance.

(1)

An imaging device including:
  a semiconductor substrate which has a first surface and a second surface opposed to each other, and in which a plurality of pixels are arranged in matrix, the semiconductor substrate including a plurality of photoelectric conversion sections that each generate electric charge corresponding to a light receiving amount by photoelectric conversion for each of the pixels;
  a first lens disposed for each of the pixels;
  a second lens disposed between the semiconductor substrate and the first lens for each of the photoelectric conversion sections;
  a first separation section provided between the photoelectric conversion sections adjacent to each other in each of the pixels and optically separating the adjacent photoelectric conversion sections from each other; and
  a second separation section provided between the pixels adjacent to each other and optically separating the adjacent pixels from each other, the second separation section protruding farther than the first separation section in a light incident direction.

(2)

The imaging device according to (1), in which the first lens condenses incident light on the second lens, and the second lens guides the incident light to the photoelectric conversion sections.

(3)

The imaging device according to (1) or (2), in which the second separation section extends between the adjacent pixels up to the first lens.

(4)

The imaging device according to any one of (1) to (3), further including, for each of the pixels, a color filter including a first transmission section and a second transmission section, above the first surface of the semiconductor substrate, the first transmission section selectively transmitting a first wavelength, the second transmission section selectively transmitting a second wavelength which is longer than the first wavelength, in which the second lens provided in each of the pixels including the first transmission section and the second lens provided in each of the pixels including the second transmission section are disposed at heights different from each other relative to the first surface.

(5)

The imaging device according to (4), in which a distance between a lens surface of the second lens and a lens surface of the first lens which are disposed in each of the pixels including the first transmission section is smaller than a distance between a lens surface of the second lens and a lens surface of the first lens which are disposed in each of the pixels including the second transmission section.

(6)

The imaging device according to (4) or (5), in which a height of the first separation section on a light incident side provided in each of the pixels including the second transmission section is lower than a height of the first separation section on the light incident side provided in each of the pixels including the first transmission section.

(7)

The imaging device according to any one of (1) to (6), in which in each of the pixels, three or more photoelectric conversion sections are arranged in at least one of a row direction or a column direction, and a plurality of the second lenses provided for the respective three or more photoelectric conversion sections have curvatures that differ depending on positions in each of the pixels.

(8)

The imaging device according to (7), in which the plurality of the second lenses provided for the respective three or more photoelectric conversion sections have larger curvatures as the second lenses are located closer to a peripheral part of each of the pixels.

(9)

The imaging device according to any one of (1) to (8), in which in each of the pixels, three or more photoelectric conversion sections are arranged in at least one of the row direction or the column direction, and the plurality of the second lenses provided for the respective three or more photoelectric conversion sections have offset amounts that differ depending on positions in each of the pixels.

(10)

The imaging device according to (9), in which the plurality of the second lenses provided for the respective three or more photoelectric conversion sections have larger offset amounts as the second lenses are located closer to the peripheral part of each of the pixels.

(11)

The imaging device according to any one of (1) to (10), further including a third lens disposed between the first lens and the second lens.

(12)

The imaging device according to (11), in which the third lens is disposed for each of the pixels.

(13)

The imaging device according to any one of (1) to (12), in which the first separation section and the second separation section have different widths.

(14)

The imaging device according to any one of (1) to (13), in which the width of the first separation section is smaller than the width of the second separation section.

(15)

The imaging device according to any one of (1) to (14), further including a multilayer wiring layer on a side of the second surface of the semiconductor substrate.

(16)

The imaging device according to any one of (1) to (15), further including a multilayer wiring layer on a side of the first surface of the semiconductor substrate, in which the first separation section and the second separation section extend from an inside of the semiconductor substrate into the multilayer wiring layer.

(17)

The imaging device according to (16), in which the first separation section and the second separation section extending into the multilayer wiring layer include at least partially a wiring line provided inside the multilayer wiring layer.

This application claims the benefit of Japanese Priority Patent Application JP2020-209677 filed with the Japan Patent Office on Dec. 17, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device comprising:
a semiconductor substrate which has a first surface and a second surface opposed to each other, and in which a plurality of pixels are arranged in matrix, the semiconductor substrate including a plurality of photoelectric conversion sections that each generate electric charge corresponding to a light receiving amount by photoelectric conversion for each of the pixels;
a first lens disposed for each of the pixels;
a second lens disposed between the semiconductor substrate and the first lens for each of the photoelectric conversion sections;
a first separation section provided between adjacent photoelectric conversion sections and optically separating the adjacent photoelectric conversion sections from each other; and
a second separation section provided between adjacent pixels and optically separating the adjacent pixels from each other, the second separation section protruding farther than the first separation section in a light incident direction,
wherein the second separation section extends between the adjacent pixels up to the first lens.

2. The imaging device according to claim 1, wherein
the first lens condenses incident light on the second lens, and
the second lens guides the incident light to the photoelectric conversion sections.

3. The imaging device according to claim 1, wherein the first separation section and the second separation section have different widths.

4. The imaging device according to claim 1, wherein a width of the first separation section is smaller than a width of the second separation section.

5. The imaging device according to claim 1, further comprising a multilayer wiring layer on a side of the second surface of the semiconductor substrate.

6. An imaging device comprising:
a semiconductor substrate which has a first surface and a second surface opposed to each other, and in which a plurality of pixels are arranged in matrix, the semiconductor substrate including a plurality of photoelectric conversion sections that each generate electric charge corresponding to a light receiving amount by photoelectric conversion for each of the pixels;
a first lens disposed for each of the pixels;
a second lens disposed between the semiconductor substrate and the first lens for each of the photoelectric conversion sections;
a first separation section provided between adjacent photoelectric conversion sections and optically separating the adjacent photoelectric conversion sections from each other:
a second separation section provided between adjacent pixels and optically seperating the adjacent pixels from each other, the second seperation section protruding farther than the first seperation section in a light direction; and
for each of the pixels, a color filter including a first transmission section and a second transmission section, above the first surface of the semiconduct or the first transmission section selectively transmitting a first wavelength, the second transmission section selectively transmitting a second wavelength which is longer than the first wavelength, wherein
the second lens provided in each of the pixels including the first transmission section and the second lens provided in each of the pixels including the second transmission section are disposed at heights different from each other relative to the first surface, and
a distance between a lens surface of the second lens and a lens surface of the first lens which are disposed in each of the pixels including the first transmission section is smaller than a distance between a lens surface of the second lens and a lens surface of the first lens which are disposed in each of the pixels including the second transmission section.

7. An imaging device comprising:
a semiconductor substrate which has a first surface and a second surface opposed to each other, and in which a plurality of pixel are arranged in matrix, the semiconductor substrate including a plurality of photoelectric conversion sections that each generate electric charge corresponding to a light receiving amount by photoelectric conversion for each of the pixels;
a first lens disposed for each of the pixels;
a second lens disposed between the semiconductor substrate and the first lens of each of the photoelectric conversion sections;
a first separation section provided between adjacent photoelectric conversion sections and optically separating the adjacent photoelectric conversion sections from each other:
a second separation section provided between adjacent pixels and optically separating the adjacent pixels from each other, the second separation section protruding farther than the first seperation section in a light incident direction; and
for each pixels, a color filter including a first transmission section and a second transmission section, above the first surface of the semiconductor substrate, the first transmission section selectively transmitting a first wavelength, the second transmission section selectively transmitting a second wavelength which is longer than the first wavelength, wherein
the second lens provided in each of the pixels including the first transmission section and the second lens provided pixels including the second transmission section are disposed at heights different from each other relative to the first surface, and
a height of the first separation section on a light incident side provided in each of the pixels including the second transmission section is lower than a height of the first separation section on the light incident side provided in each of the pixels including the first transmission section.

8. An imaging device comprising:
a semiconductor substrate which has a first surface and a second surface opposed to each other, and in which a plurality of pixels are arranged in matrix, the semiconductor substrate including a plurality of photoelectric conversion sections that each generate electric change corresponding to a light receiving amount by photoelectric conversation for each of the pixels;
a first lens disposed for each of the pixels:
a second lens disposed between the semiconductor substrate and the first lens for each of the photoelectric conversion sections;
a first seperation section provided between adjacent photoelectric conversion sections and optically seperating the adjacent photoelectric conversion sections from each other; and
a second separation section provided between adjacent pixels and optically separating the adjacent pixels from each other, the second separation section protruding farther the first separation section in a light incident direction, wherein
in each of the pixels, three or more photoelectric conversion sections are arranged in at least one of a row direction or a column direction,
the second less is one of a plurality of second lenses provided for the respective three or more photoelectric conversion sections, and
the plurality of second lenses respectively have curvatures that differ depending on positions in each of the pixels.

9. The imaging device according to claim 8, wherein the plurality of the second lenses provided for the respective three or more photoelectric conversion sections have larger curvatures as the second lenses are located closer to a peripheral part of each of the pixels.

10. An imaging device comprising:
a semiconduct which has a first surface and a second surface opposed to each other, and in which a plurality of pixels are arranged in matrix, the semiconductor substrate including a plurality of photoelectric conversion sections that each generate electric charge corresponding to a light receiving amount by photoelectric conversion for each of the pixels;
the first lens disposed for each of the pixels;
a second lens disposed between the semiconductor substrate and the first lens for each of the photoelectric conversion sections;

a first seperation section provided between adjacent photoelectric conversion sections and optically seperating the adjacent photoelectric conversion sections from each other; and a second seperation section provided between adjacent pixels and optically seperating the adjacent pixels from each other, the second seperation section protruding farther than the first seperation section in a light incident direction, wherein in each of the pixels, three or more photoelectric conversion sections are arranged in at least one of a row direction or column direction, the second lens is one of a plurality of second lenses provided for the respective three or more photoelectric conversion sections, and the plurality of second lenses respectively have offset amounts that differ depending on positions in each of the pixels.

11. The imaging device according to claim 10, wherein the plurality of the second lenses provided for the respective three or more photoelectric conversion sections have larger offset amounts as the second lenses are located closer to a peripheral part of each of the pixels.

12. An imaging devices comprising:

a semiconductor substrate which has a first surface and a second surface opposed to each other, and in which a plurality of pixels are arranged in matrix, the semiconductor substrate including a plurality of photoelectric conversion sections that each generate electric charge corresponding to a light receiving amount by photoelectric conversion for each of the pixels;

a first lens disposed of the pixels;

a second lens disposed between the semiconductor substrate and the first lens for each of the photoeletric conversion sections;

a first separation section provided between adjacent photoeletric conversion sections and optically seperating the adjacent photoelectric conversion sections from each other;

a second seperation section provided betwen adjacent pixels and optically seperating the adjacent pixels from each other, the seperation section protruding farther than the first seperation section in a light incident direction; and a third lens disposed between the first lens and the second lens.

13. The imaging device according to claim 12, wherein the third lens is disposed for each of the pixels.

14. An imaging device comprising:

a semiconductor substrate which has a first surface and a second surface opposed to each other, and in which a plurality of pixels are arrannged in matrix, the semiconductor substrate including a plurality of photoelectic conversion sections that each generate electric charge corresponding to a light receiving amount by photoelectric conversion for each of th pixels;

a first lens disposed for each of the pixels;

a second lens disposed between the semiconductor substrate and the first lens for each of the photoelectric conversion sections;

a first separation section provided between adjacent photoelectric conversion sections and optically separating the adjacent photoelectric conversion sections from each other;

a second seperation section provided between adjacent pixels and optically separating the adjacent pixels from each other, the second seperation section protruding farther than the first seperation section in a light incident direction; and a multilayer wiring layer on a side of the first surface of the semiconductor substrate, wherein the first separation section and the second separation section extend from an inside of the semiconductor substrate into the multilayer wiring layer.

15. The imaging device according to claim 14, wherein the first separation section and the second separation section extending into the multilayer wiring layer include at least partially a wiring line provided inside the multilayer wiring layer.

* * * * *